US012584461B2

(12) United States Patent
Fabre et al.

(10) Patent No.: US 12,584,461 B2
(45) Date of Patent: Mar. 24, 2026

(54) FLOATING OFFSHORE WIND TURBINE APPARATUS AND INSTALLATION METHOD

(71) Applicants: Jason C. Fabre, Houston, TX (US); E. John Greeves, Houston, TX (US); Philip S. Rundle, Houston, TX (US); Ian R. Todd, Houston, TX (US)

(72) Inventors: Jason C. Fabre, Houston, TX (US); E. John Greeves, Houston, TX (US); Philip S. Rundle, Houston, TX (US); Ian R. Todd, Houston, TX (US)

( * ) Notice: Subject to any disclaimer, the term of this patent is extended or adjusted under 35 U.S.C. 154(b) by 464 days.

(21) Appl. No.: 18/166,961

(22) Filed: Feb. 9, 2023

(65) Prior Publication Data

US 2024/0084782 A1 Mar. 14, 2024

Related U.S. Application Data

(60) Provisional application No. 63/384,568, filed on Nov. 21, 2022, provisional application No. 63/404,719, filed on Sep. 8, 2022.

(51) Int. Cl.
*F03D 13/25* (2016.01)
*B63B 21/50* (2006.01)
(Continued)

(52) U.S. Cl.
CPC .............. *F03D 13/25* (2016.05); *B63B 21/50* (2013.01); *B63B 35/28* (2013.01);
(Continued)

(58) Field of Classification Search
CPC ......... F03D 13/25; B63B 21/50; B63B 35/28; B63B 2035/446; F05B 2240/93; F05B 2240/95
See application file for complete search history.

(56) References Cited

U.S. PATENT DOCUMENTS 3,323,478 A * 6/1967 Hunsucker ................ B63B 1/14
114/265
3,933,110 A * 1/1976 Jamieson .................. B63B 1/14
114/39.28
(Continued)

FOREIGN PATENT DOCUMENTS

CN 103758705 4/2014
EP 1269018 1/2003
(Continued)

OTHER PUBLICATIONS

PCT International Search Report and the Written Opinion of the International Searching Authority, PCT/US2023/012733, Dated Jun. 12, 2023.

*Primary Examiner* — Joshua E Freeman
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

An offshore floating wind turbine apparatus provides a pair of spaced apart hull sections with a space between the hull sections. One or more gantries each connect to the hull sections. The one or more gantries are spaced apart and connected to the hull sections with pivotal or universal joint connections. A wind turbine tower has upper and lower end portions. The wind turbine tower has a lower end portion with a base that is mounted to one of the gantries. The tower upper end portion has a rotor, hub, nacelle, and blades. A mooring system preferably holds the hull sections on a desired offshore marine location.

27 Claims, 36 Drawing Sheets

(51) Int. Cl.
 *B63B 35/28* (2006.01)
 *B63B 35/44* (2006.01)
(52) U.S. Cl.
 CPC ..... *B63B 2035/446* (2013.01); *F05B 2240/93* (2013.01); *F05B 2240/95* (2013.01)

(56) References Cited

U.S. PATENT DOCUMENTS

| | | | | |
|---|---|---|---|---|
| 5,435,259 | A * | 7/1995 | Labrador | B01D 61/10 114/39.31 |
| 6,294,844 | B1 * | 9/2001 | Lagerwey | F03D 13/25 290/55 |
| 6,979,171 | B2 * | 12/2005 | Lauritsen | F03D 13/25 415/908 |
| 7,220,104 | B2 | 5/2007 | Zheng et al. | |
| 7,527,006 | B2 | 5/2009 | Khachaturian | |
| 7,845,296 | B1 | 12/2010 | Khachaturian | |
| 7,886,676 | B2 | 2/2011 | Khachaturian | |
| 8,061,289 | B2 | 11/2011 | Khachaturian | |
| 8,123,484 | B2 | 2/2012 | Choi et al. | |
| 8,240,264 | B2 | 8/2012 | Khachaturian | |
| 8,302,940 | B2 * | 11/2012 | Chen | F03D 13/10 261/92 |
| 8,683,872 | B1 | 4/2014 | Khachaturian et al. | |
| 8,740,543 | B2 | 6/2014 | Weaver | |
| 8,820,254 | B2 | 9/2014 | Tosello | |
| 8,960,114 | B2 | 2/2015 | Khachaturian | |
| 9,003,988 | B2 * | 4/2015 | Khachaturian | B63B 71/00 114/61.18 |
| 9,527,560 | B2 | 12/2016 | Khachaturian | |
| 9,604,710 | B2 | 3/2017 | Khachaturian | |
| 9,611,013 | B2 * | 4/2017 | Dunne | F03B 13/264 |
| 9,701,376 | B2 | 7/2017 | Khachaturian | |
| 9,926,042 | B2 | 3/2018 | Khachaturian | |
| 10,161,387 | B2 | 12/2018 | Frydendal | |
| 10,173,758 | B2 | 1/2019 | Khachaturian | |
| 10,184,587 | B1 | 1/2019 | Khachaturian | |
| 10,279,872 | B2 | 5/2019 | Khachaturian | |
| 10,286,985 | B2 | 5/2019 | Khachaturian | |
| 10,308,328 | B2 | 6/2019 | Siegfriedsen | |
| 10,486,779 | B2 * | 11/2019 | Khachaturian | B63B 1/14 |
| 10,543,890 | B2 | 1/2020 | Khachaturian | |
| 10,800,498 | B2 | 10/2020 | Khachaturian | |
| 10,960,959 | B2 | 3/2021 | Khachaturian | |
| 11,034,416 | B2 | 6/2021 | Khachaturian | |
| 11,034,417 | B2 | 6/2021 | Khachaturuian | |
| 11,345,452 | B2 | 5/2022 | Khachaturian | |
| 11,353,006 | B2 | 6/2022 | Munk-Hansen | |
| 11,383,799 | B2 | 7/2022 | Colmard et al. | |
| 11,384,736 | B1 | 7/2022 | Piasecki et al. | |
| 2004/0163580 | A1 * | 8/2004 | Burg | B63B 1/322 114/271 |
| 2010/0150663 | A1 * | 6/2010 | Torres Martinez | E02D 27/425 405/222 |
| 2011/0126748 | A1 * | 6/2011 | Wu | F03D 13/40 254/133 R |
| 2011/0129334 | A1 * | 6/2011 | Wu | B63B 35/4413 415/126 |
| 2011/0139056 | A1 * | 6/2011 | Cholley | F03D 13/10 405/209 |
| 2011/0265700 | A1 * | 11/2011 | Mallet | B63B 7/04 114/39.26 |
| 2012/0073485 | A1 * | 3/2012 | Khachaturian | B63B 1/121 114/51 |
| 2012/0103244 | A1 | 5/2012 | Gong et al. | |
| 2012/0255478 | A1 | 10/2012 | Hadeler et al. | |
| 2013/0019792 | A1 | 1/2013 | Jahnig et al. | |
| 2013/0233231 | A1 | 9/2013 | Dagher et al. | |
| 2017/0356423 | A1 * | 12/2017 | Galdos Tobalina | F03D 7/0204 |
| 2019/0135385 | A1 * | 5/2019 | Serna García-Conde | B63B 1/14 |
| 2021/0108612 | A1 * | 4/2021 | Foster | F03B 13/187 |
| 2022/0081072 | A1 | 3/2022 | Bonnaffoux et al. | |
| 2022/0128034 | A1 | 4/2022 | Krogenes et al. | |
| 2022/0234697 | A1 | 7/2022 | Hjelmstad et al. | |
| 2023/0382495 | A1 * | 11/2023 | Lackner | H01M 8/0656 |
| 2024/0208619 | A1 * | 6/2024 | Hasholt | B63C 1/02 |
| 2024/0309852 | A1 * | 9/2024 | Peña Sagastuy | B63B 35/44 |
| 2024/0336333 | A1 * | 10/2024 | Ånensen | B63B 21/50 |

FOREIGN PATENT DOCUMENTS

| | | |
|---|---|---|
| JP | 2001509565 | 7/2001 |
| WO | WO200134977 | 5/2001 |
| WO | WO2021191766 | 9/2021 |
| WO | WO2022086329 | 4/2022 |

* cited by examiner

FLOATING OFFSHORE WIND TURBINE APPARATUS AND INSTALLATION METHOD

CROSS-REFERENCE TO RELATED APPLICATIONS

Priority of U.S. Provisional Patent Application Ser. No. 63/404,719, filed 8 Sep. 2022, and U.S. Provisional Patent Application Ser. No. 63/384,568, filed 21 Nov. 2022, each of which is hereby incorporated herein by reference, is hereby claimed.

STATEMENT REGARDING FEDERALLY SPONSORED RESEARCH OR DEVELOPMENT

Not applicable

BACKGROUND OF THE INVENTION

1. Field of the Invention

The present invention relates to a floating offshore wind turbine apparatus having a base that includes a catamaran hull that connects two hulls with one or more spaced apart gantries, wherein assembly can be perfected in a port, harbor, inland waterway and wherein transport to an off-shore locale can be achieved with a wind turbine tower and other components (e.g., blades, rotor, nacelle) erected and fully commissioned prior to such transport.

2. General Background of the Invention

Wind turbines are commercially available devices that generate electricity. In many western and midwestern states in the United States of America, large numbers of such wind turbines form wind farms. Wind turbines are also placed in a marine environment such as in offshore wind farms (e.g., Hornsea One, United Kingdom and Clyde Wind Farm, United Kingdom). In the USA, wind turbines are operational off the East Coast (e.g., Block Island Wind Farm). Manufacturers of wind turbines include GE, Vestos, and Siemens as examples. U.S. Pat. Nos. 7,220,104; 8,123,484; 10,161, 387; and 11,353,006 disclose wind turbines. U.S. Pat. Nos. 7,220,104; 8,123,484; 10,161,387; and 11,353,006 are each hereby incorporated herein by reference.

U.S. Provisional Patent Application Ser. No. 63/404,719, filed 8 Sep. 2022, and U.S. Provisional Patent Application Ser. No. 63/384,568, filed 21 Nov. 2022, are each hereby incorporated herein by reference.

Other patents have issued that are directed to wind turbines that are adapted to a marine environment. Examples of such patents and patent application publications are found in the following Table 1. Each reference listed in Table 1 is hereby incorporated herein by reference.

TABLE 1

| Patent/ Publication No. | Title | Issued MM/DD/YYYY |
|---|---|---|
| 8,740,543 | OFFSHORE WIND TURBINES AND DEPLOYMENT METHOS THEREFOR | 06/03/2014 |
| 8,820,254 | CATAMARAN SHIP USED FOR ASSEMBLING, TRANSPORTING AND INSTALLING A MARINE WIND TURBINE ON THE SEAFLOOR | 09/02/2014 |

TABLE 1-continued

| Patent/ Publication No. | Title | Issued MM/DD/YYYY |
|---|---|---|
| 10,308,328 | FLOATING WIND TURBINE WITH A FLOATING FOUNDATION, AND METHOD FOR INSTALLATION OF SUCH A WIND TURBINE | 06/04/2019 |
| 11,383,799 | FLOATING SUPPORT STRUCTURE FOR OFFSHORE WIND TURBINE AND METHOD FOR INSTALLING A WIND TURBINE PROVIDED WITH SUCH A SUPPORT STRUCTURE | 07/12/2022 |
| 11,384,736 | FLOATING OFFSHORE WIND TURBINE SYSTEM, APPARATUS AND METHOD | 07/12/2022 |
| 2012/0103244 | TRUSS CABLE SEMI-SUBMERSIBLE FLOATER FOR OFFSHORE WIND TURBINES AND CONSTRUCTION METHODS | 05/03/2012 |
| 2012/0255478 | SHIP AND METHOD FOR CONVEYING AND SETTING UP OFFSHORE STRUCTURES INPUT-OUTPUT CIRCUIT | 10/11/2012 |
| 2013/0019792 | FLOATING FOUNDATION FOR MASS PRODUCTION | 01/24/2013 |
| 2013/0233231 | FLOATING WIND TURBINE PLATFORM AND METHOD OF ASSEMBLING | 09/12/2013 |
| 2022/0081072 | FLOATING WIND TURBINE SUPPORT | 03/17/2022 |
| 2022/0128034 | FLOATING WINDMILL INSTALLATION | 04/28/2022 |
| 2022/0234697 | A FLOATING STRUCTURE AND METHOD OF INSTALLATION | 07/28/2022 |
| WO200134977A1 | METHOD AND SYSTEM FOR INSTALLING AND TRANSPORTING AN OFFSHORE WIND POWER STATION AT SEA | 05/17/2001 |
| EP1269018A1 | FLOATING OFFSHORE WIND POWER INSTALLATION | 01/02/2003 |

Patents have issued for catamaran lifting apparatus and catamaran personnel quarters as well as oil production structures. The following Table 2 lists examples of such patents. Patents listed in Table 2 are each hereby incorporated herein by reference.

TABLE 2

| U.S. Pat. No. | Title | Issued MM/DD/YYYY |
|---|---|---|
| 7,527,006 | MARINE LIFTING APPARATUS | 05/05/2009 |
| 7,845,296 | MARINE LIFTING APPARATUS | 12/07/2010 |
| 7,886,676 | MARINE LIFTING APPARATUS | 02/15/2011 |
| 8,061,289 | MARINE LIFTING APPARATUS | 11/22/2011 |
| 8,240,264 | MARINE LIFTING APPARATUS | 08/14/2012 |
| 8,683,872 | TEST WEIGHT | 04/01/2014 |
| 8,960,114 | MARINE LIFTING APPARATUS | 02/24/2015 |
| 9,527,560 | MARINE LIFTING APPARATUS | 12/27/2016 |
| 9,604,710 | MARINE LIFTING APPARATUS | 03/28/2017 |
| 9,701,376 | MARINE LIFTING APPARATUS | 07/11/2017 |
| 9,926,042 | MARINE LIFTING APPARATUS | 03/27/2018 |
| 10,173,758 | MARINE LIFTING APPARATUS | 01/08/2019 |
| 10,184,587 | UNDERWATER PIPE LIFTING AND CUTTING APPARTUS AND METHOS | 01/22/2019 |
| 10,279,872 | FLOATING CATAMARAN PRODUCTION PLATFORM | 05/07/2019 |
| 10,286,985 | MARINE LIFTING APPARATUS | 05/14/2019 |
| 10,486,779 | FLOATING CATAMARAN PRODUCTION PLATFORM | 11/26/2019 |

TABLE 2-continued

| U.S. Pat. No. | Title | Issued MM/DD/YYYY |
|---|---|---|
| 10,543,890 | MARINE LIFTING APPARATUS | 01/28/2020 |
| 10,800,498 | METHOD AND APPARATUS FOR SUPPORTING A PERSONNEL HOUSING IN A MARINE ENVIRONMENT | 10/13/2020 |
| 10,960,959 | MARINE LIFTING APPARATUS | 03/30/2021 |
| 11,034,416 | FLOATING CATAMARAN PRODUCTION PLATFORM | 06/15/2021 |
| 11,034,417 | FLOATING CATAMARAN PRODUCTION PLATFORM | 06/15/2021 |
| 11,345,452 | MARINE LIFTING APPARATUS | 05/31/2022 |

BRIEF SUMMARY OF THE INVENTION

The apparatus of the present invention provides an apparatus that includes first and second hulls (e.g., barges) connected by one (FIGS. 19, 20) or a pair of gantries, frames or trusses. Each gantry, frame or truss preferably connects to each hull (e.g., barge) with a connection, e.g., pinned, hinged or universal joint connections (or a combination of pinned, hinged and universal joint connections). In one preferred embodiment, a first end of a first frame or truss can attach to a first hull with a pinned or hinged connection while the other end of the first frame can attach to a second hull with a universal joint connection. A first end of the second frame preferably connects to the first hull with a universal joint connection while the second end of the second frame preferably connects to the second hull with a pinned or hinged connection. In another preferred embodiment, each frame or truss can connect to the two (2) hulls at frame ends with pinned or pivotal connections.

The apparatus of the present invention provides an apparatus that includes first and second hulls (e.g., barges) connected by one or more gantries, frames or trusses. Each gantry, frame or truss preferably connects to each hull (e.g., barge) with a connection, e.g., pinned, hinged or universal joint connections (or a combination of pinned, hinged and universal joint connections). In one preferred embodiment, a first end of a frame or truss can attach to a first hull with a pinned or hinged connection while the other end of the frame or truss can attach to a second hull with a universal joint connection. In another preferred embodiment, both ends of the frame or truss can connect to the two (2) hulls with pinned or pivotal or uniaxial pinned connections.

In one preferred embodiment, there is a single gantry supporting a wind turbine.

In one preferred embodiment, the single gantry supporting a wind turbine has two wide sides.

In one preferred embodiment, the wide sides can be attached with uniaxial pinned connections and no pin-in-ins.

In one preferred embodiment, there can be multiple pinned connections on a common axis.

In one preferred embodiment, there can be at least four (4) pinned connections on a common axis.

In one preferred embodiment, the common axis can be at the center line of the hull or barge.

In one preferred embodiment, the pinned connections preferably coincide with a center line of the barge.

In either embodiment, one frame or gantry preferably supports a wind turbine with generating capacity from preferably about 5 to 50 MW, and up to 80 MW or more. A second frame or gantry can be used for supporting utilities and other turbine support equipment. Barge or hull sizes can vary, for example, from about 150 ft. (45.7 m) in length to about 500 ft. (152.4 m) in length. Barge widths can vary, for example, from about 50 ft (15.24 m) to 150 ft (45.7 m).

In one or more preferred embodiments, a system of the present invention allows a wind turbine to be preferably installed and fully commissioned quayside using static (e.g., land based) cranes. The system can thus be towed offshore to an installation site fully assembled and commissioned. The system can be deployed for example in water depth range of about 50 ft. (15.24 m) to 15,000 ft. (4,572 m).

In one or more preferred embodiments, a system of the present invention can be held on location preferably using a spread mooring system. The mooring system can consist of multiple (e.g., 4 to 16) individual mooring legs. The mooring system can be pre-installed prior to the arrival of a floating wind turbine apparatus on location. The pre-installed mooring system can be laid out on the seabed for subsequent retrieval or attached to temporary surface buoys, for example. The system of the present invention being installed can be connected to the pre-installed mooring system. The mooring system can be made of chain, wire, synthetic or any combination of these. The apparatus of the present invention can be unmanned if desired.

The performance of the system of preferred embodiments of the present invention (e.g., pitch and roll during wind power production) can be optimized to meet turbine operational limits preferably through barge-size selection (e.g., use of bigger barges, e.g., of about 550 to 750 ft (about 168 to 229 m) to reduce static pitch and roll). Platform decommissioning at the end of life can be by simple reversal of installation.

A preferred embodiment of the present invention includes an offshore floating wind turbine apparatus including a pair of spaced apart hull sections with a space between the hull sections. A pair of gantries each preferably connect to the hull sections. The gantries can be spaced apart, each preferably connected to a hull section with a pivotal or universal joint connection. A wind turbine tower having upper and lower end portions is preferably supported by the hull sections and gantries. The wind turbine tower has a lower end portion preferably mounted to one of the gantries. The wind turbine tower can be mounted at any point along the gantry. The tower upper end portion preferably has a rotor, hub, and blades. A mooring system preferably holds the hull sections on a desired location.

In one preferred embodiment, at least one of the gantries can be a truss.

In one preferred embodiment, the mooring system includes multiple mooring lines that can be anchored at one end to the seabed and at a second end to one or both of the hull sections.

In one preferred embodiment, the wind turbine can have a generating capacity of 5-50 MW.

In one preferred embodiment, the wind turbine can have a generating capacity of 5-80 MW.

In one preferred embodiment, the mooring system can be in about 50-15,000 feet (15.24-4,572 m) of water depth.

In one preferred embodiment, each hull section can be about 150-500 feet (45.72-152.4 m) in length.

In one preferred embodiment, the mooring system preferably includes multiple mooring legs.

In one preferred embodiment, the mooring system can include between 4 and 16 mooring legs.

In one preferred embodiment, the tower lower end preferably attaches to a gantry at a position that is in between the hull sections.

In one preferred embodiment, the hull sections can be generally parallel.

In one preferred embodiment, the truss includes a tubular member and wherein the turbine tower connects to the tubular member.

In one preferred embodiment, at least one gantry has a wider end and a narrower end.

In one preferred embodiment, at least one gantry has two wide ends.

In one preferred embodiment, the pair of gantries each has two wide ends.

In one preferred embodiment, the wide ends include uniaxial pinned connections and no pin-in-ins.

In one preferred embodiment, one hull section is longer than the other hull section.

In one preferred embodiment, the mooring system can include multiple mooring lines.

A preferred embodiment of the present invention includes an offshore floating wind turbine apparatus having pair of spaced apart barges with a space between the barges. A pair of frames are provided that each preferably connect to both of the barges. The frames are spaced apart, each frame preferably connected to a barge with a pivotal or universal joint connection.

The barges and frames can support a wind turbine tower having upper and lower end portions. The wind turbine tower lower end portion has a base that is preferably mounted to one of the frames. The tower upper end portion has a rotor, hub, nacelle, and blades. The nacelle can contain known wind turbine components.

A mooring system preferably holds the barges on a desired location.

In one preferred embodiment, at least one of the frames can be a truss.

In one preferred embodiment, the mooring system includes multiple mooring lines that are preferably anchored at a first end to the seabed and at a second end to one or both of the barges.

In one preferred embodiment, the mooring system includes multiple mooring legs.

In one preferred embodiment, the mooring system includes between 8 and 16 mooring legs.

In one preferred embodiment, the tower lower end attaches to a frame preferably at a position that is in between the barges.

In one preferred embodiment, each barge has a bow and stern and wherein the base is preferably in between each hull, bow and stern.

In one preferred embodiment, each barge has a bow at both ends and wherein the base is preferably in between each of the hulls bows.

In one preferred embodiment, each barge has two bows and wherein said base is in between each of the bows.

A preferred embodiment of the present invention includes a method of installing an offshore floating wind turbine apparatus. At a first location, the method preferably attaches a wind turbine tower to a floating catamaran structure that includes first and second spaced apart hull sections and first and second spaced apart frames, wherein the tower has a tower lower end with a base that can be attached to the first frame section.

Blades, rotor and hub are preferably added to the tower at a tower upper end portion.

The floating catamaran structure can travel over water to a second location that is an offshore marine location.

The hull sections can be moored to the seabed at the second location.

Electricity is then generated at the second location with the wind turbine.

In one preferred embodiment, the method employs one or more land based lifting devices that lift the tower and place it on a frame that is supported by the hull sections.

In one or more preferred embodiments, the land based lifting devices can include a land based crawler crane, jack-up lift vessel, floating crane barge/lift vessel, and/or land based custom shear leg lift device.

In one preferred embodiment, the first location can be a harbor.

In one preferred embodiment, the first location can be an inland waterway.

In one preferred embodiment, the wind turbine can be assembled before travel to the second location.

In one preferred embodiment, the method preferably includes pivotally attaching each frame to a hull section.

In one preferred embodiment, the blades, hub and rotor can be attached to the tower at the first location.

In one preferred embodiment, the method includes transferring the tower and blades to the catamaran structure with a land based lifting apparatus.

In one preferred embodiment, the method includes transferring nacelle, hub, blades, and rotor to the catamaran structure with a land based lifting apparatus.

In one preferred embodiment, the first and second frames are each preferably pinned to each hull section.

In one preferred embodiment, the pair of gantries can be each pinned to each hull section.

In one preferred embodiment, the pair of gantries can be pinned to each hull section with uniaxial pinned connections.

In one preferred embodiment, the uniaxial pinned connections can be on a common axis.

In one preferred embodiment, the common axis can be the center line of the hull section.

In one preferred embodiment, the first and second frames can be pinned to each hull section with uniaxial pinned connections.

A preferred embodiment of the present invention provides an offshore floating wind turbine apparatus comprising a pair of spaced apart hull sections with a space between said hull sections. One or more gantries can connect to the hull sections. The one or more gantries can be spaced apart, each preferably connected to a hull section with a uniaxial pinned connection. A wind turbine tower can have upper and lower end portions, the wind turbine tower lower end portion preferably mounted to one of the one or more gantries. The wind turbine tower upper end portion having a rotor, hub, and blades. A mooring system that preferably holds the hull sections on a desired location.

In one preferred embodiment, the one or more frames can be connected to a hull section with multiple uniaxial pinned connections.

In one preferred embodiment, at least one of the one or more gantries can be a truss.

In one preferred embodiment, wherein the mooring system includes multiple mooring lines that can anchored at one end to a seabed and at a second end to one or both of hull sections.

In one preferred embodiment, at least one of the one or more gantries has a wider end and a narrower end.

In one preferred embodiment, at least one of the one or more gantries has two wide ends.

In one preferred embodiment, a pair of gantries each has two wide ends.

In one preferred embodiment, one hull section can be longer than the other hull section.

In one preferred embodiment, the hull sections can be the same length.

A preferred embodiment of the present invention provides a method of installing an offshore floating wind turbine apparatus, comprising the steps of:

a) attaching, at a first location, a wind turbine tower to a floating catamaran structure that includes first and second spaced apart hull sections and one or more spaced apart frames, wherein the tower has a tower lower end with a base that is attached to one of the one or more frames;

b) adding blades, rotor and hub to the wind turbine tower at a tower upper end portion;

c) traveling the floating catamaran structure over water to a second location that is an offshore marine location;

d) mooring the hull sections to a seabed at the second location; and e) generating electricity with the wind turbine after step "d".

In one preferred embodiment, a method of the present invention includes attaching one or more frames to each hull section with uniaxial pinned connections.

In one preferred embodiment, the one or more frames are each pinned to each hull section.

BRIEF DESCRIPTION OF THE SEVERAL VIEW OF THE DRAWINGS

For a further understanding of the nature, objects, and advantages of the present invention, reference should be had to the following detailed description, read in conjunction with the following drawings, wherein like reference numerals denote the like elements and wherein.

DETAILED DESCRIPTION OF THE INVENTION

Figure 1:
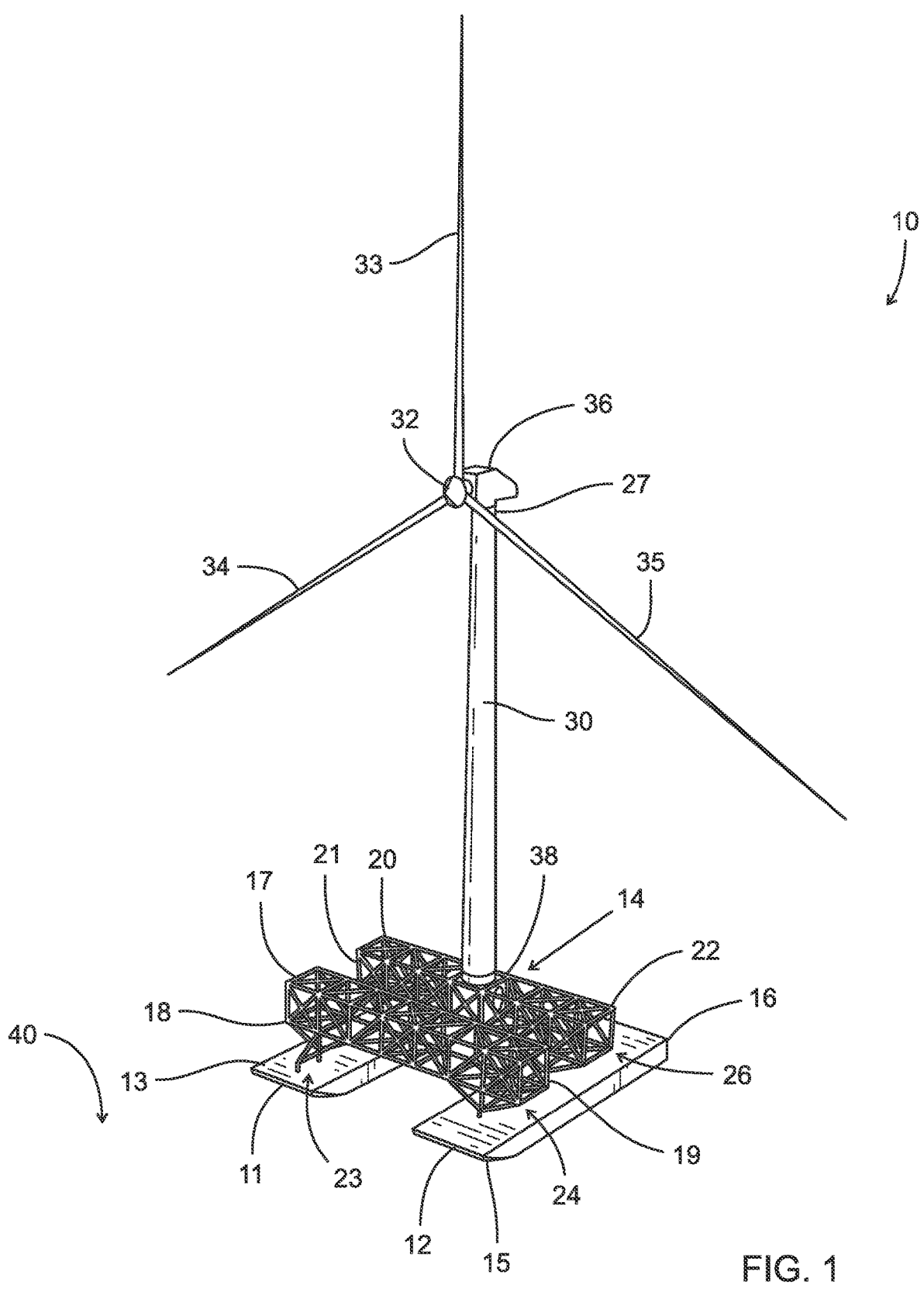
FIG. 1 is a perspective view of a preferred embodiment of the apparatus of the present invention.

FIGS. 1-16 show a preferred embodiment of the apparatus of the present invention designated generally by the numeral 10. Floating wind turbine apparatus 10 can be seen in FIGS. 1-10 floating on water surface 40 (e.g., ocean, sea, harbor, bay, waterway). The present invention provides a catamaran arrangement 10 that preferably has a pair of hulls or barges including a first hull or barge 11 and second hull or barge 12. Hull or barge 11 has bow 13 and stern 14. Hull or barge 12 has bow 15 and stern 16.

Two frames or gantries 17, 20 preferably connect to the hulls or barges 11, 12 in an arrangement that spaces the barges or hulls 11, 12 apart with a space or gap 37 in between while also spacing the frames 17, 20 apart as seen in FIGS. 1-10. The frames include first frame 17 with end portions 18, 19 and second frame 20 with end portions 21, 22. End portion 18 of frame 17 can be a narrower end portion and end portion 19 of frame 17 can be a wider end portion. End portion 21 of frame 20 can be a wider end portion and end portion 22 of frame 20 can be a narrower end portion. Hulls 11, 12 and frames 17, 20 preferably form a catamaran like floating structure that supports wind turbine T (commercially available, e.g., from GE, Vestos, and Siemens). In one preferred embodiment, the turbine T tower or column 30 connects to large tubular member 38 that is a part of truss 20 as seen in FIGS. 1-10 and 14-16. Wind turbine T tower or column 30 can be bolted or welded to tubular member 38, such as to rim 39.

Connections 23, 24, 25, 26 form an interface between hulls 11, 12 and frames 17, 20. All four connections 23, 24, 25, 26 can be pinned or pivotal connections. Alternatively, each frame 17, 20 can connect to one barge or hull with a pivotal or pinned connection and to the other barge or hull with a universal joint.

In FIGS. 1-10, the connection 23 of frame 17 end 18 to hull 11 can be a universal joint connection. The connection 24 of frame 17 end portion 19 to hull 12 can be a pinned or pivotal connection. In FIGS. 1-10, the connection 25 of frame 20 end portion 21 to hull 11 can be a pinned or pivotal connection while the connection 26 of end portion 22 to hull 12 can be a universal joint connection.

Figure 6:
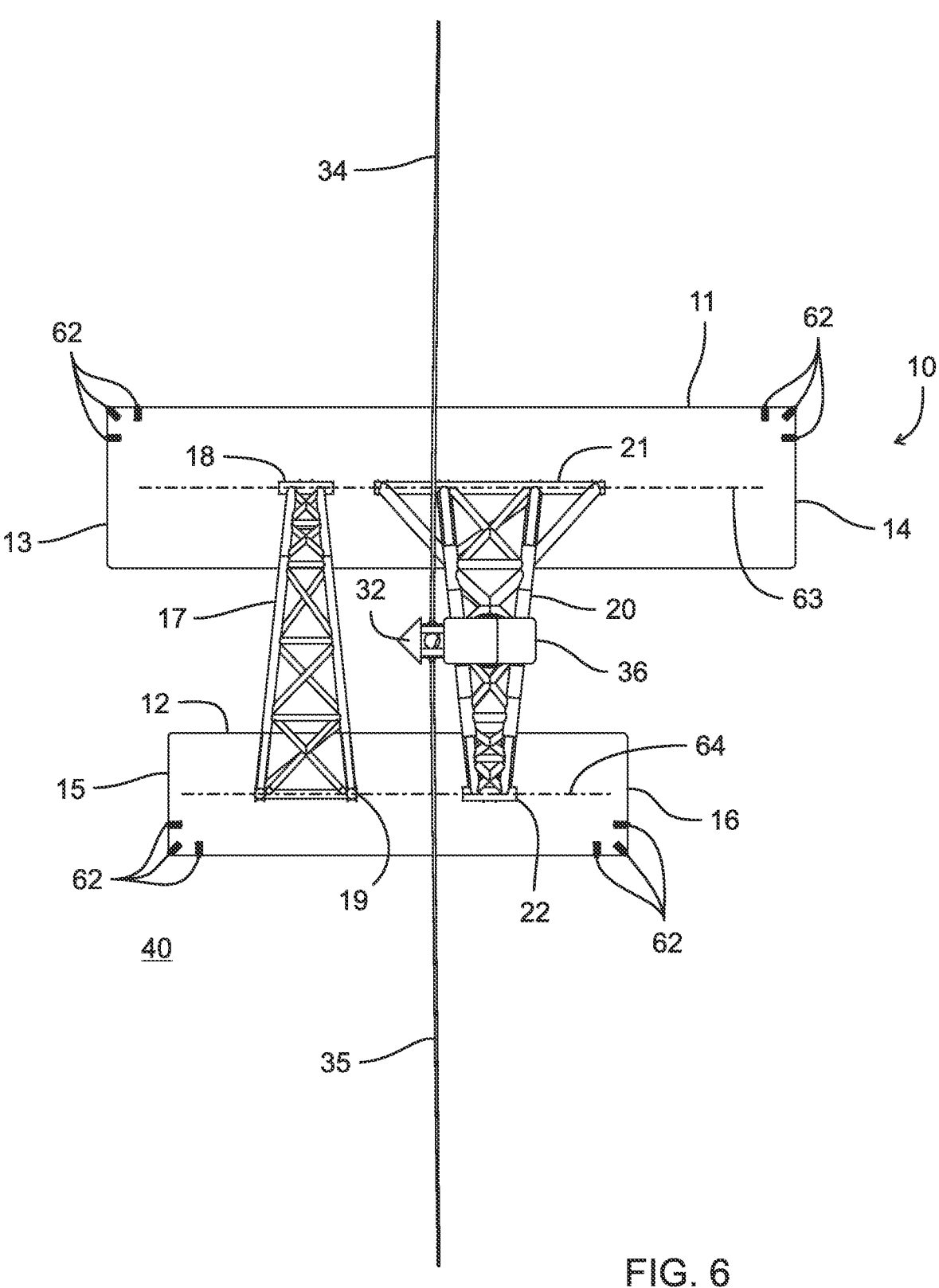
FIG. 6 is a plan view of a preferred embodiment of the apparatus of the present invention.
Figure 7:
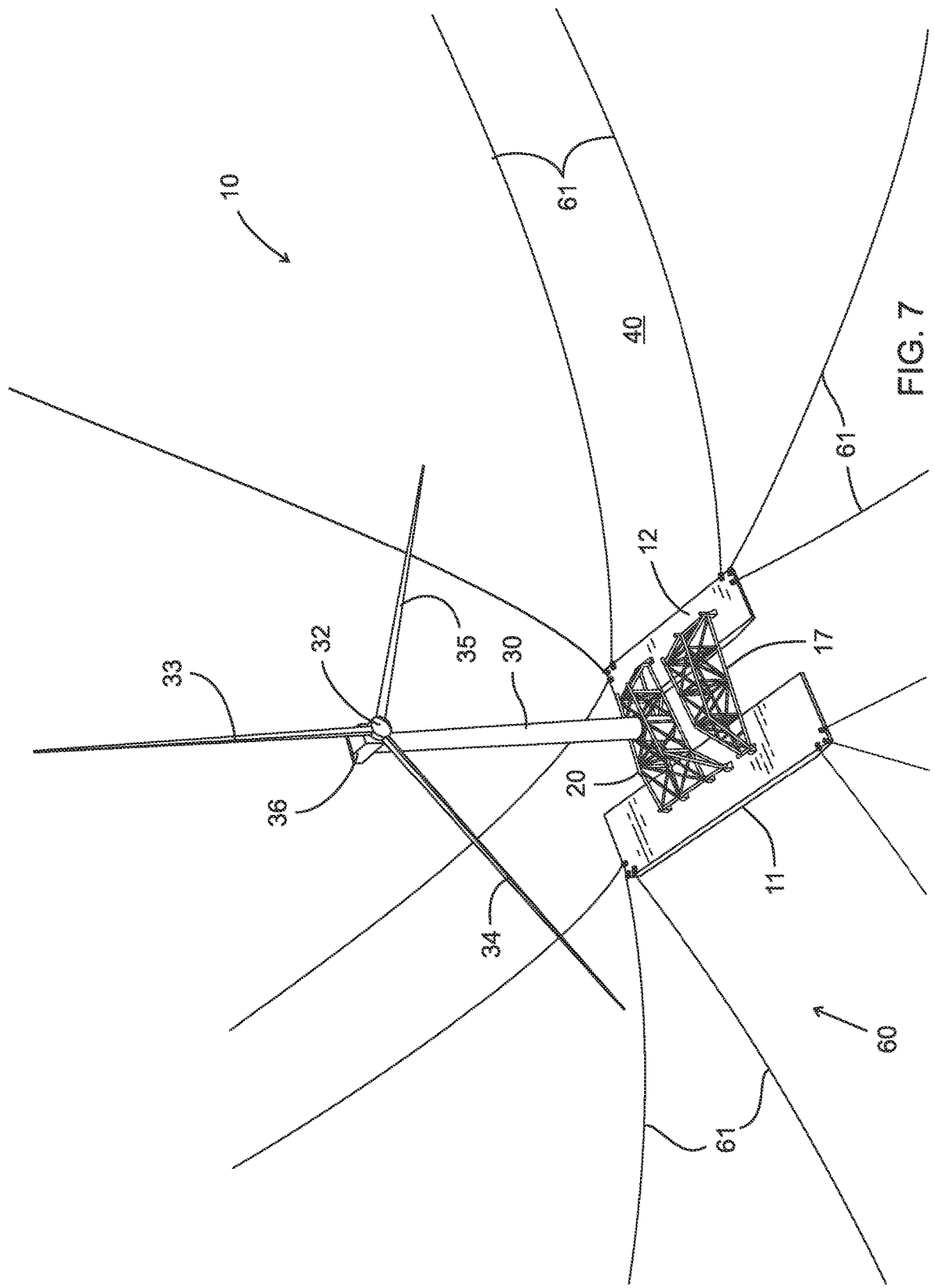
FIG. 7 is a perspective view of a preferred embodiment of the apparatus of the present invention showing a mooring arrangement.
Figure 8:
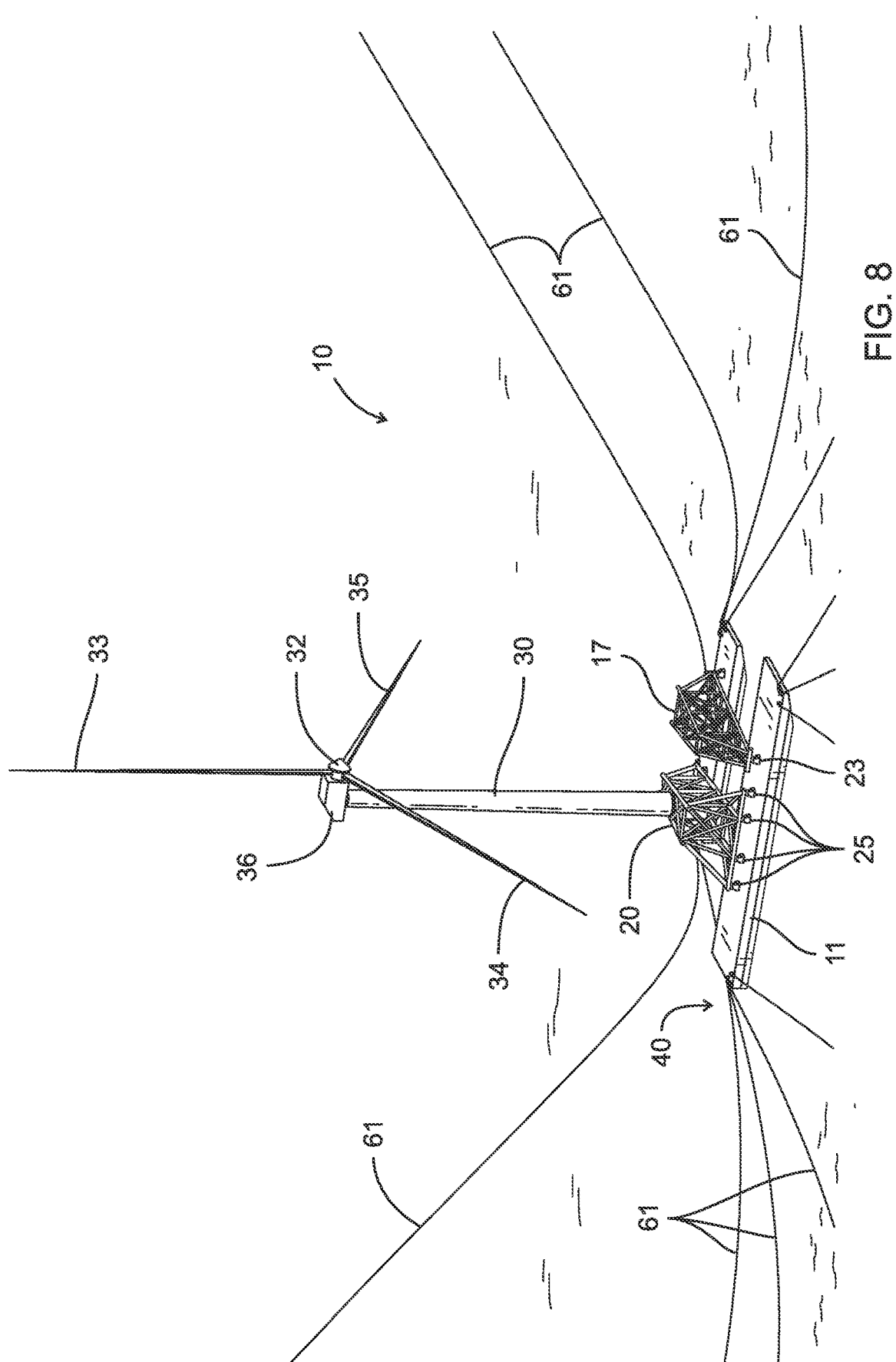
FIG. 8 is a perspective view of a preferred embodiment of the apparatus of the present invention showing a mooring arrangement.
Figure 9:
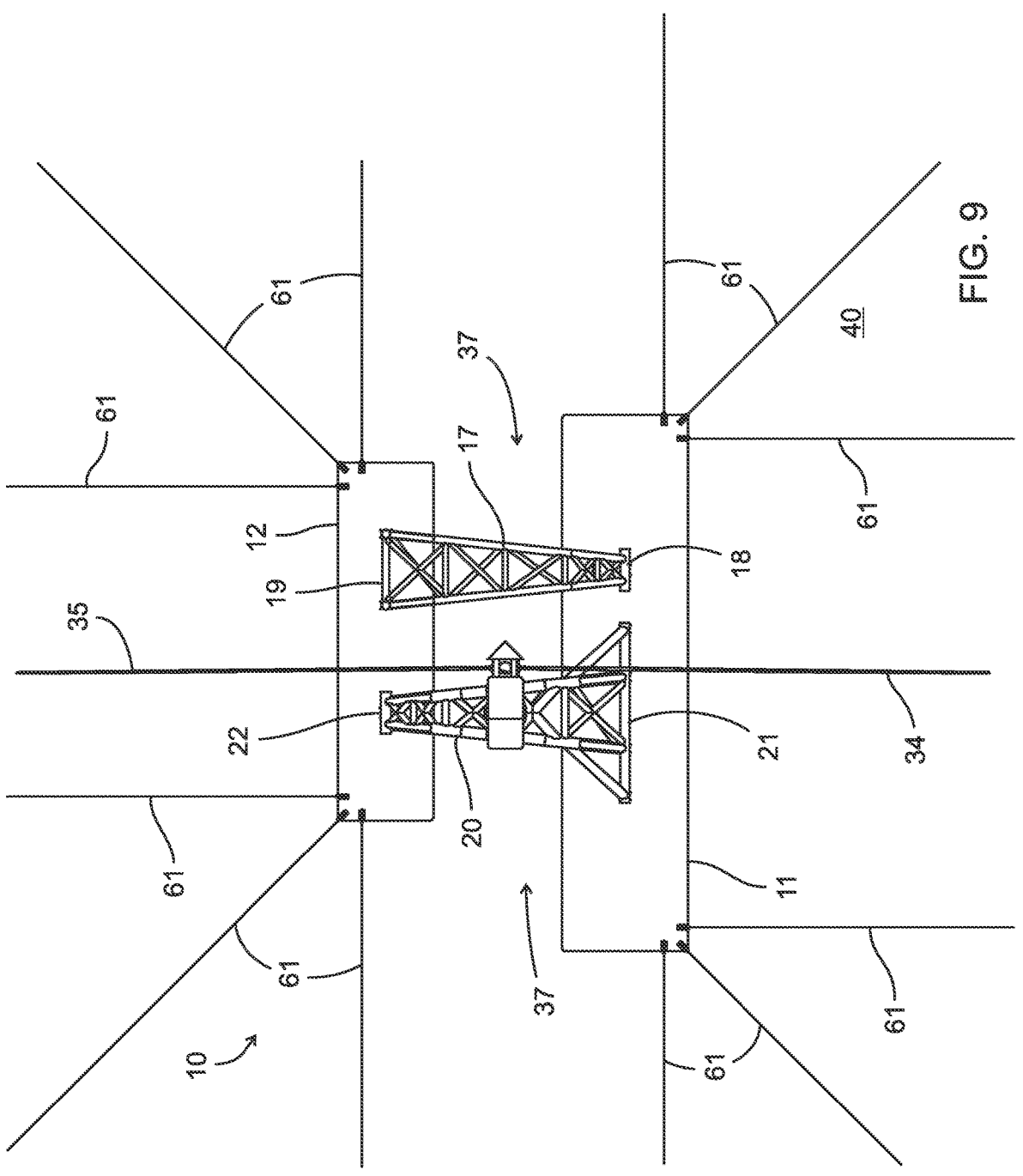
FIG. 9 is a plan view of a preferred embodiment of the apparatus of the present invention showing a mooring arrangement.
Figure 10:
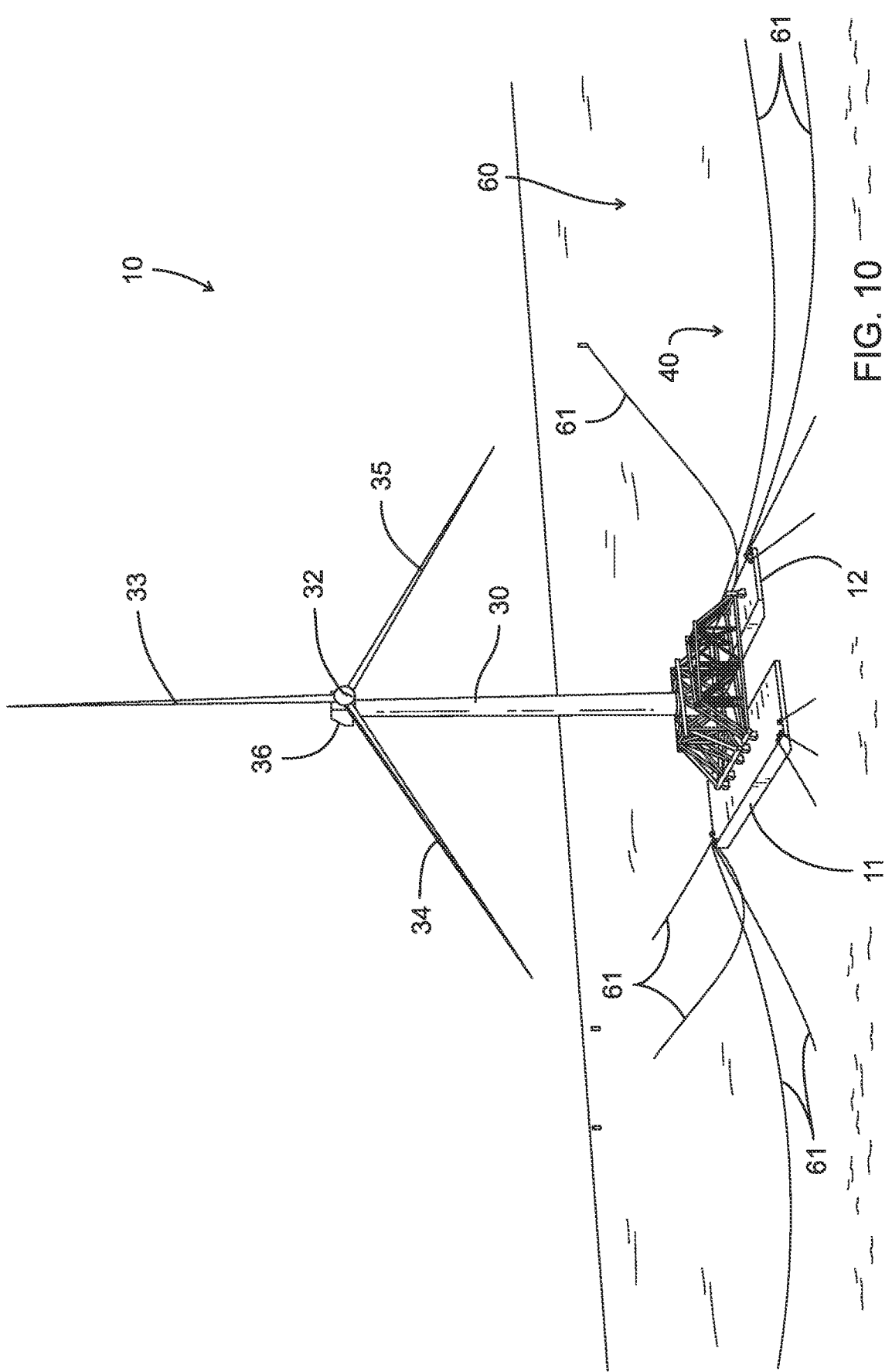
FIG. 10 is a perspective view of a preferred embodiment of the apparatus of the present invention showing a mooring arrangement.
Figure 11:
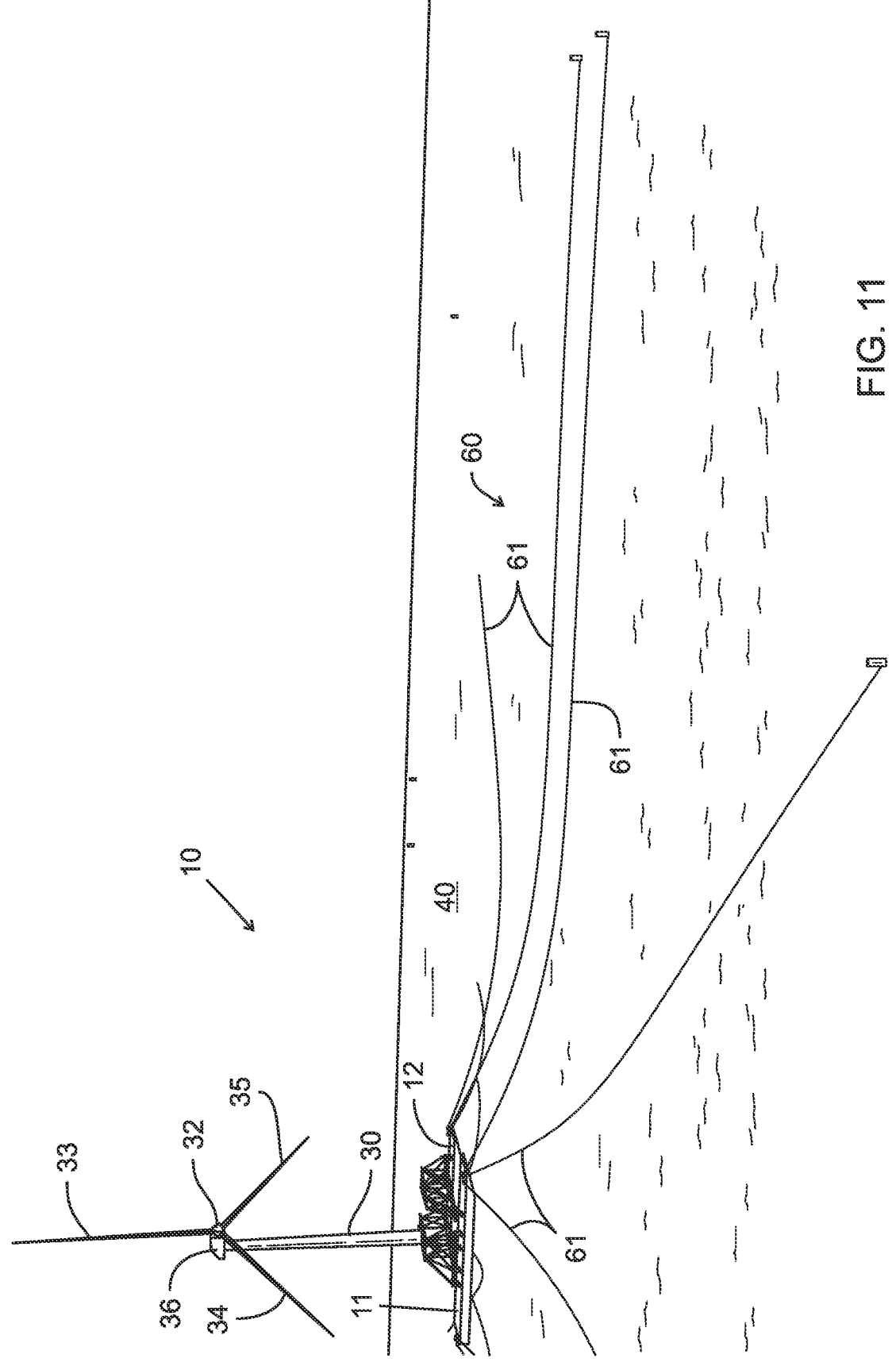
FIG. 11 is a perspective view of a preferred embodiment of the apparatus of the present invention showing a mooring arrangement.

In FIGS. 1-10, the pivotal connection 25 of frame 20 to barge 11 can be a plurality of pinned or pivotal connections (e.g., four (4)) that share a common pivotal axis. Similarly, the pivotal or pinned connection 24 of frame 17 with barge 12 can be a plurality of pivotal or pinned connections (e.g., two (2)) that share a common pivotal axis. The common axis can be center line 63, 64 of the barge or hull 11, 12 as seen in FIG. 6.

Barge 11 is the barge supporting the wide end 21 of gantry or frame 20. Gantry or frame 20 supports wind turbine T tower 30 and its parts (e.g., nacelle 36, hub 32, blades 33, 34, 35 and related known internal parts). Barge 12 supports the wide end 19 of the non-turbine gantry or truss 17.

For head seas condition, the pitching motion of the turbine T can be optimized by increasing the dimensions of barge 11 (e.g., increase length, increase width, or increase both length and width). As described herein, a larger barge is considered to be one having a width of about 150 to 225 ft (about 46 to 69 m) and a length of about 500 to 750 ft (about 152 to 229 m). A smaller barge is considered to be one have a width of about 40 to 80 ft (about 12 to 24 m) and a length of about 150 to 250 ft (about 46 to 76 m). The longer and wider barge 11 is, the less the pitching motion will be of the turbine T.

FIGS. 1-10 and 14-16 show truss 20 with tubular member 38. Truss 20 can be of welded steel construction, preferably having lower at least substantially horizontal or lateral members 41, 42 and upper at least substantially horizontal or lateral members 43, 44. At least substantially vertical or longitudinal members 45, 46, 47, 48, 49, 50 each connect to both a lower horizontal member 41 or 42 and an upper horizontal member 43 or 44. Vertical members 45, 46, 47 can each span between lower horizontal member 41 and upper horizontal member 43. Similarly, vertical members 48, 49, 50 can each span between lower horizontal member 42 and upper horizontal member 44.

Figure 14:
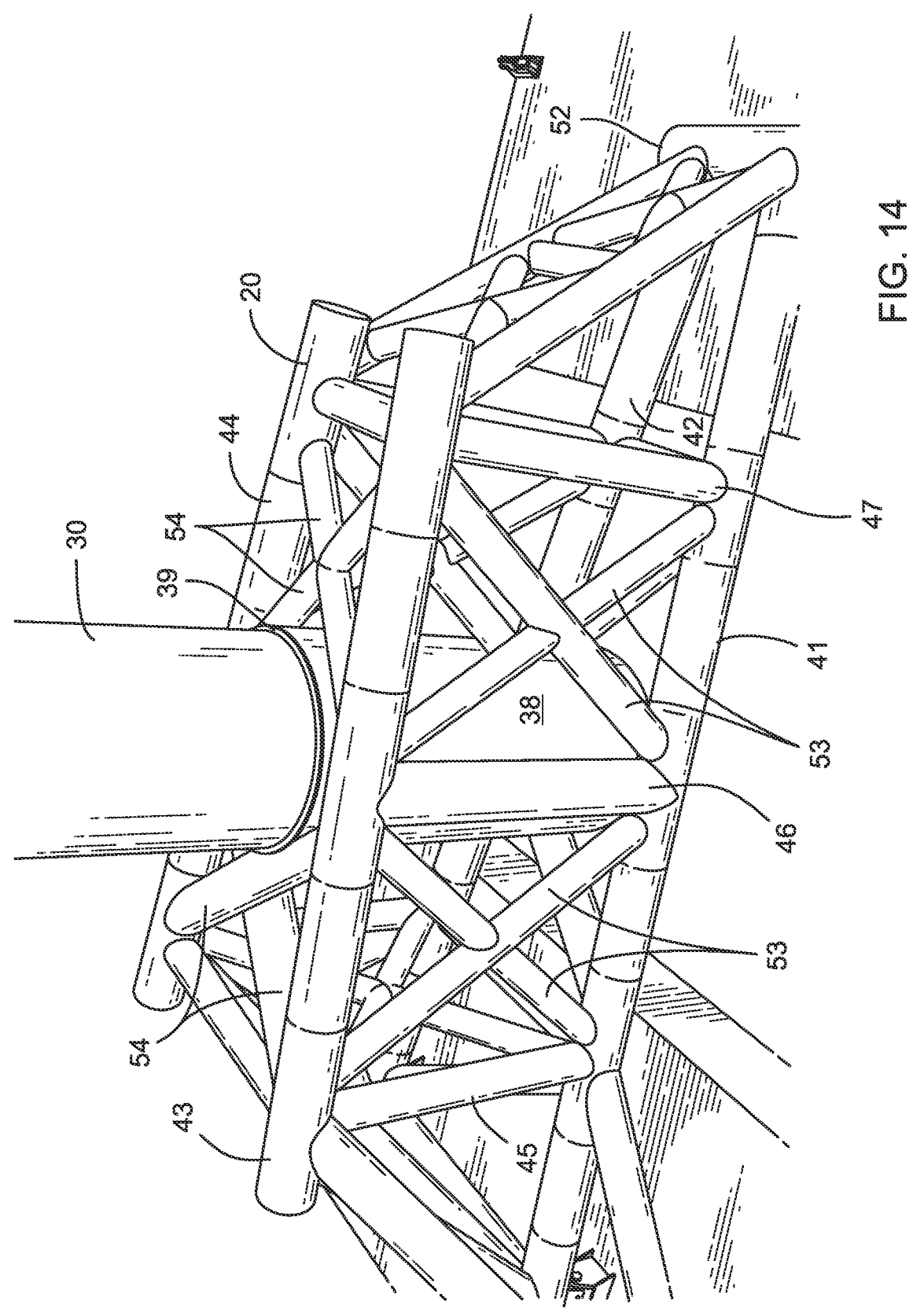
FIG. 14 is a partial perspective view of a preferred embodiment of the apparatus of the present invention illustrating connection of a wind turbine tower to gantry or truss.
Figure 15:
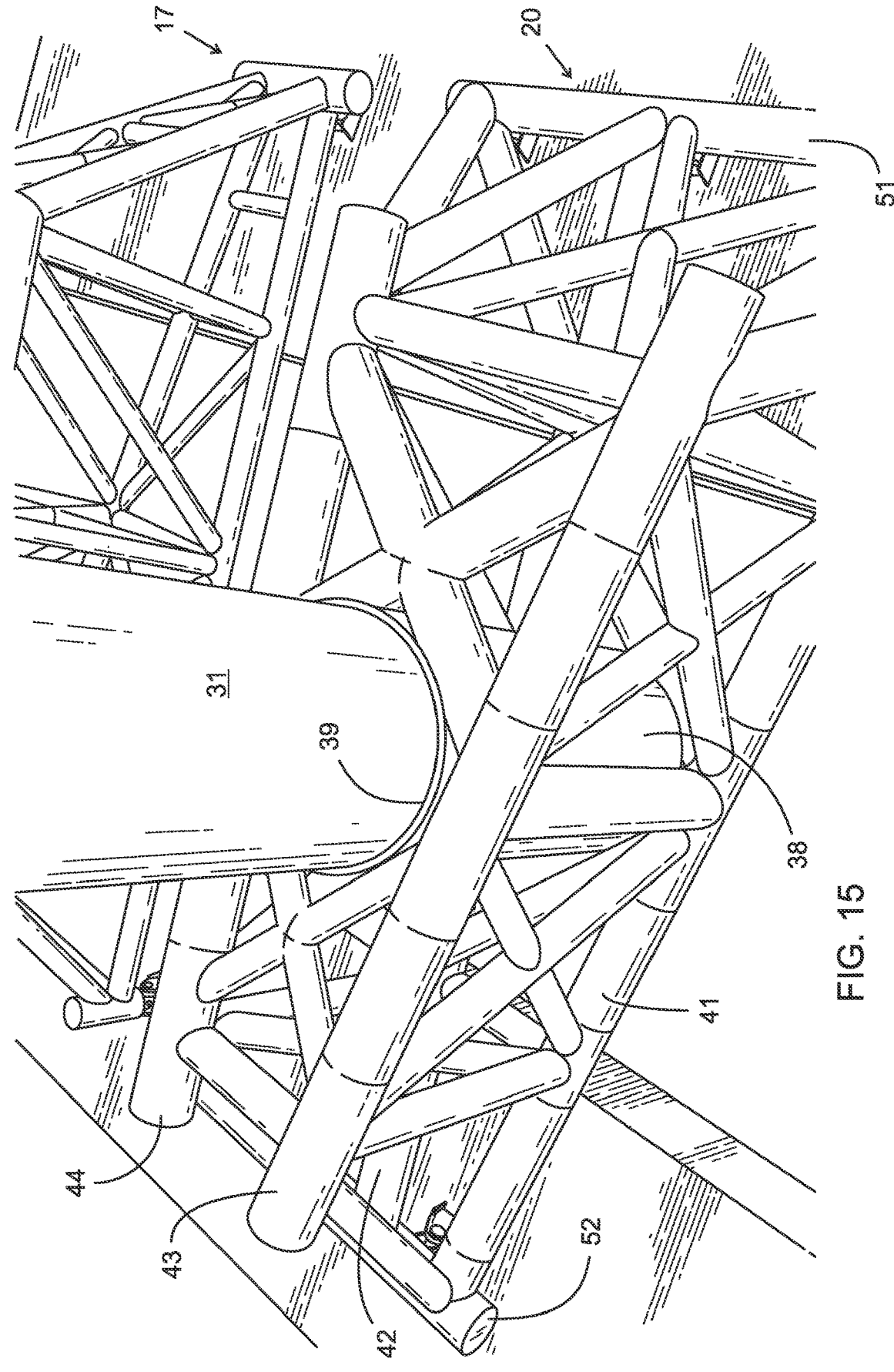
FIG. 15 is a partial perspective view of a preferred embodiment of the apparatus of the present invention illustrating connection of a wind turbine tower to gantry or truss.
Figure 16:
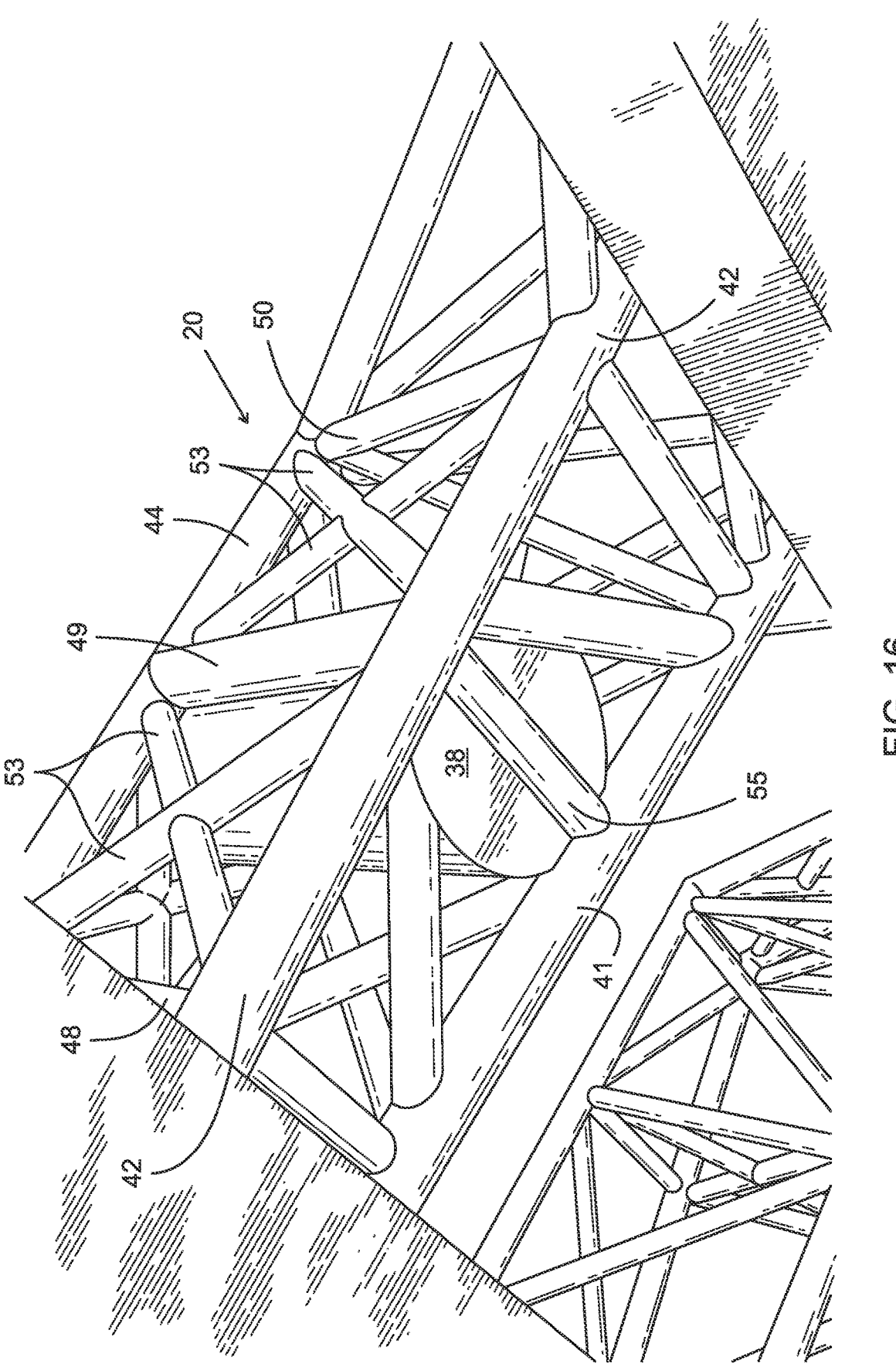
FIG. 16 is a partial perspective view of a preferred embodiment of the apparatus of the present invention illustrating connection of a wind turbine tower to gantry or truss.

At the ends of truss 20 are provided transverse members 51, 52. Each transverse member 51, 52 preferably connects to a lower horizontal member 41, 42. Inclined diagonal members 53 each span between a lower horizontal member 41, 42 and an upper horizontal member 43, 44 as well as from one vertical member 45-50 to another vertical member 45-50 as seen in FIGS. 14-16. Upper diagonal members 54 each connect to upper horizontal members 43, 44 and to cylindrical or tubular member 38. Tubular member 38 is also connected (e.g., welded) to upper and lower horizontal members 41, 42, 43, 44. A transverse beam 55 is preferably placed under tubular member 38 as seen in FIG. 16. Beam 55 is connected (e.g., welded) to lower horizontal members 41, 42. There can be welded connections that connect tubular member 38 to vertical members 46, 49. Tubular member 38 has an annular portion or rim 39 to which base 31 of tower 30 is connected (e.g., welded or bolted).

Tower 30 has a base or lower end 31 (see FIG. 15) that is preferably attached to one frame (e.g., frame 20). Tower 30 can support known wind turbine components including blades 33, 34, 35 that are attached to hub 32 which is affixed to housing or nacelle 36 in FIG. 2, for example. Nacelle 36 can contain other known wind turbine components as shown in the above patents that are incorporated herein by reference.

Figure 2:
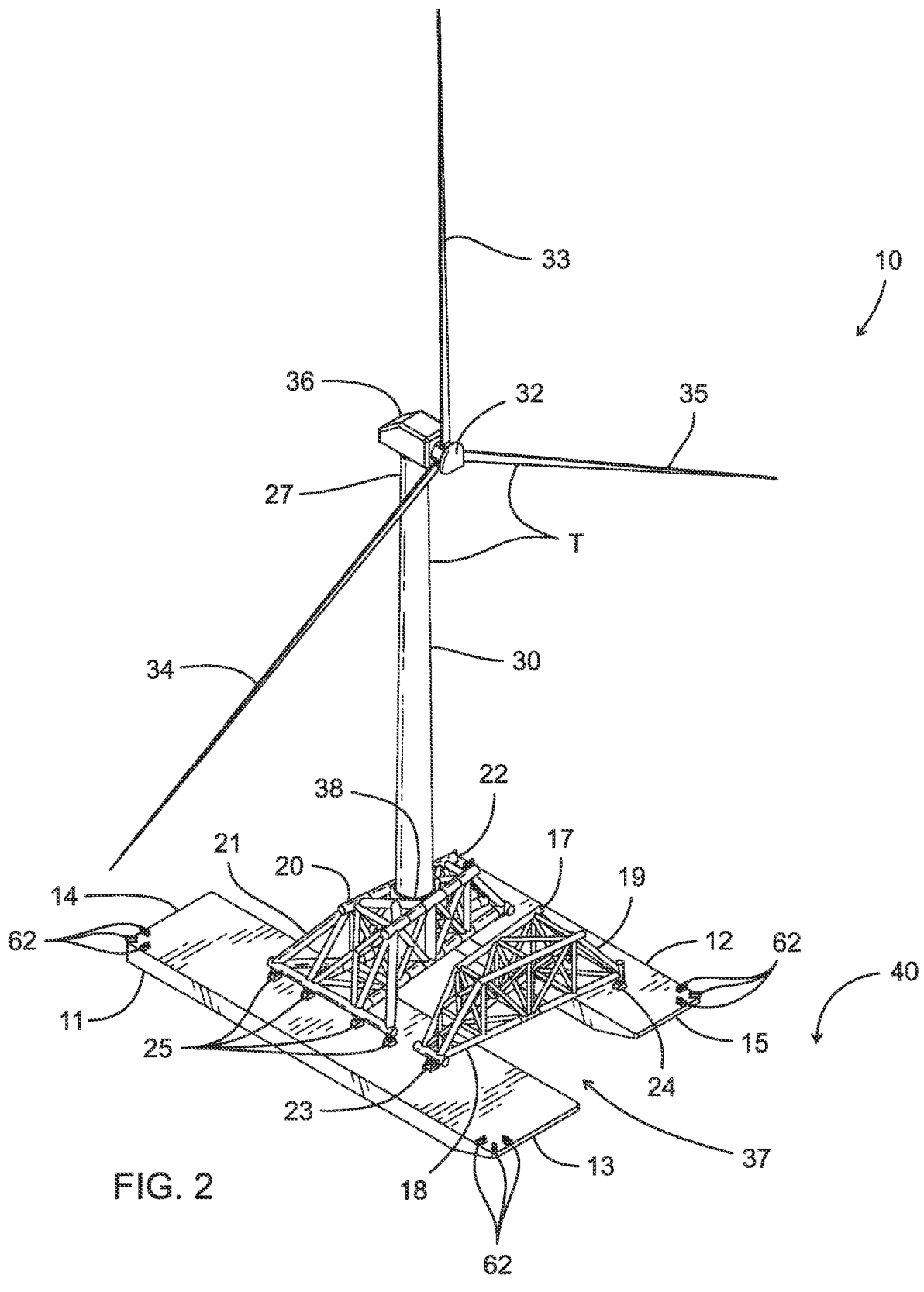
FIG. 2 is a perspective view of a preferred embodiment of the apparatus of the present invention.
Figure 3:
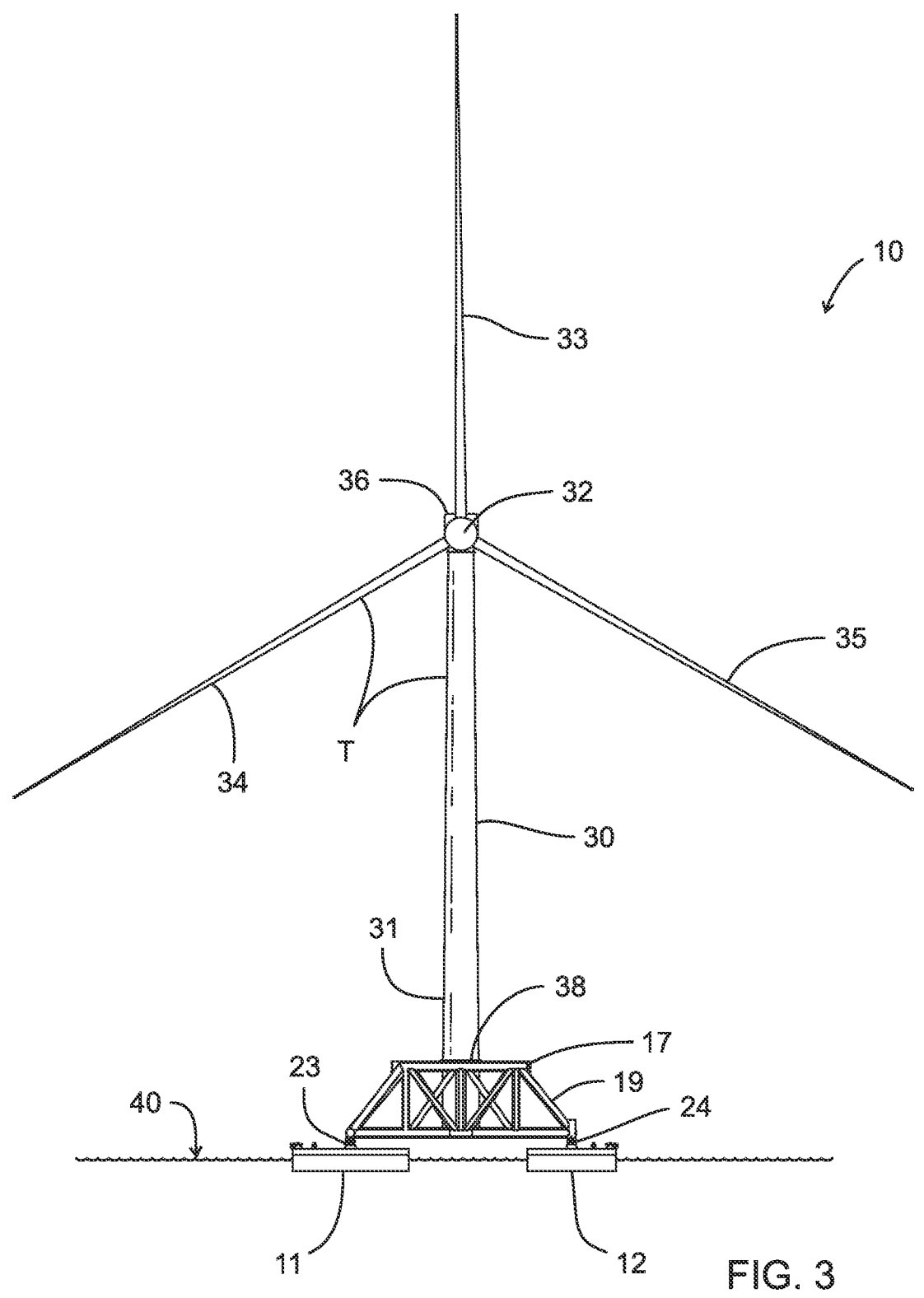
FIG. 3 is a front elevation view of a preferred embodiment of the apparatus of the present invention.
Figure 4:
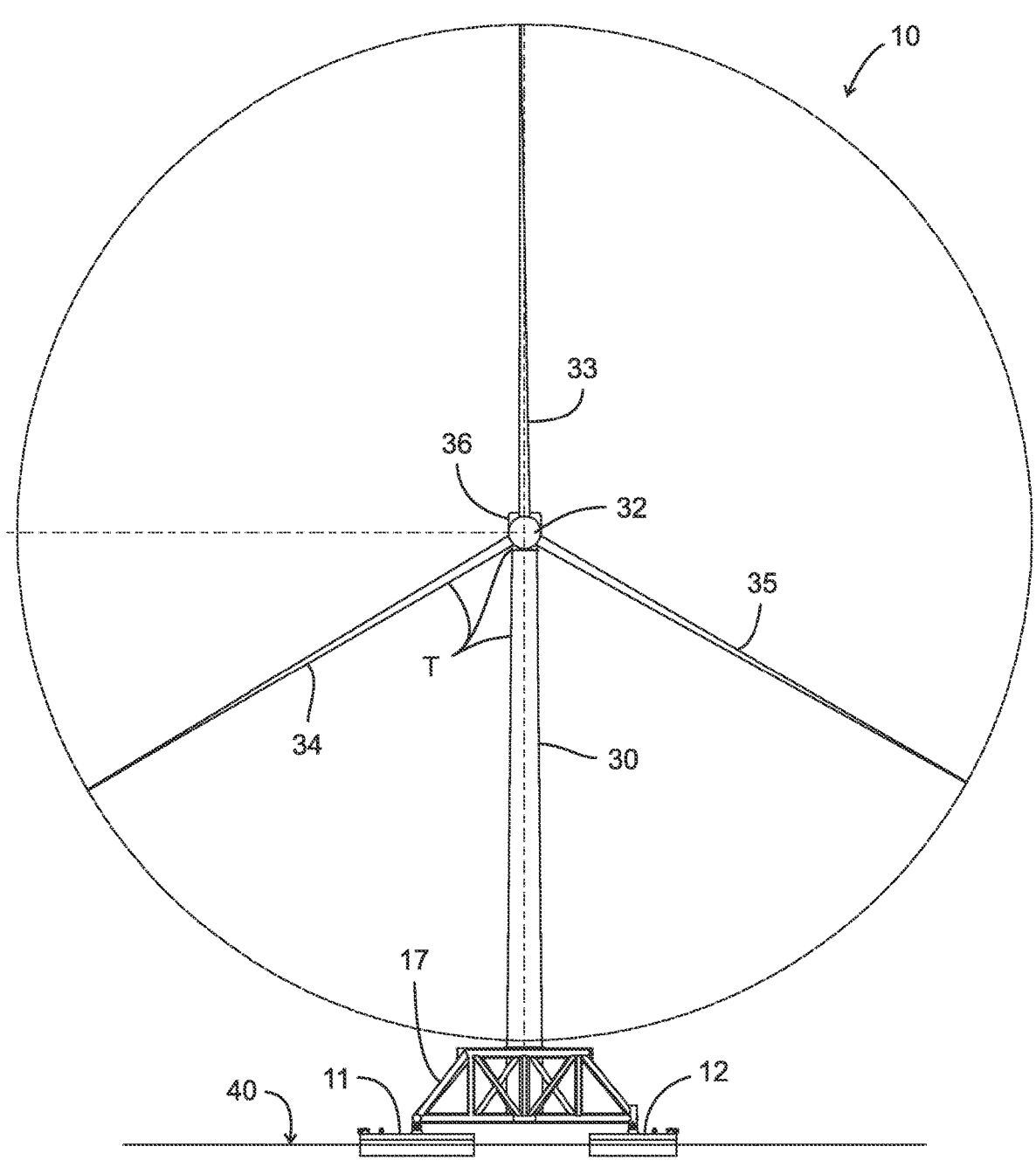
FIG. 4 is a front elevation view of a preferred embodiment of the apparatus of the present invention.
Figure 5:
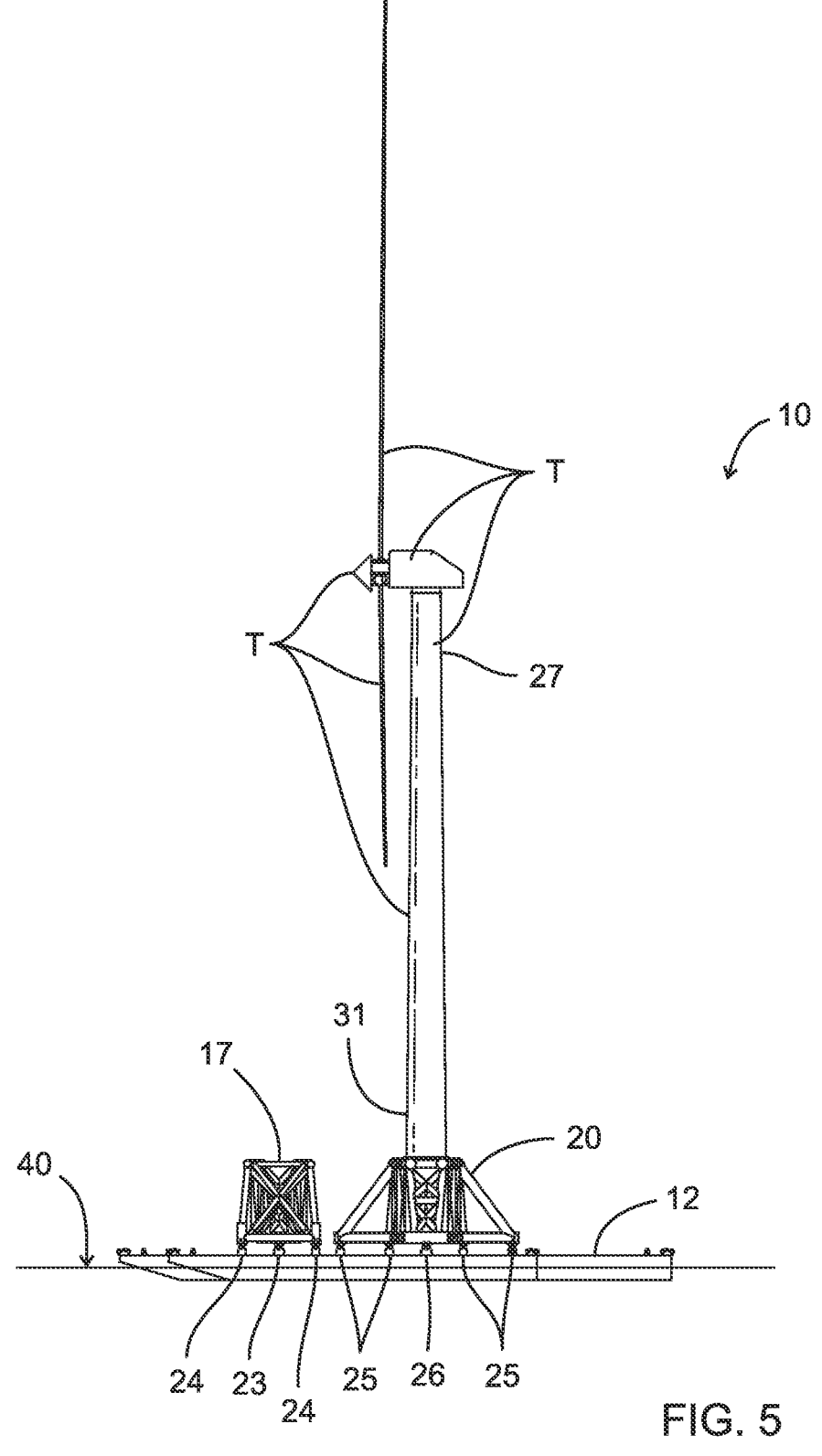
FIG. 5 is a side, elevation view of a preferred embodiment of the apparatus of the present invention.
Figure 12:
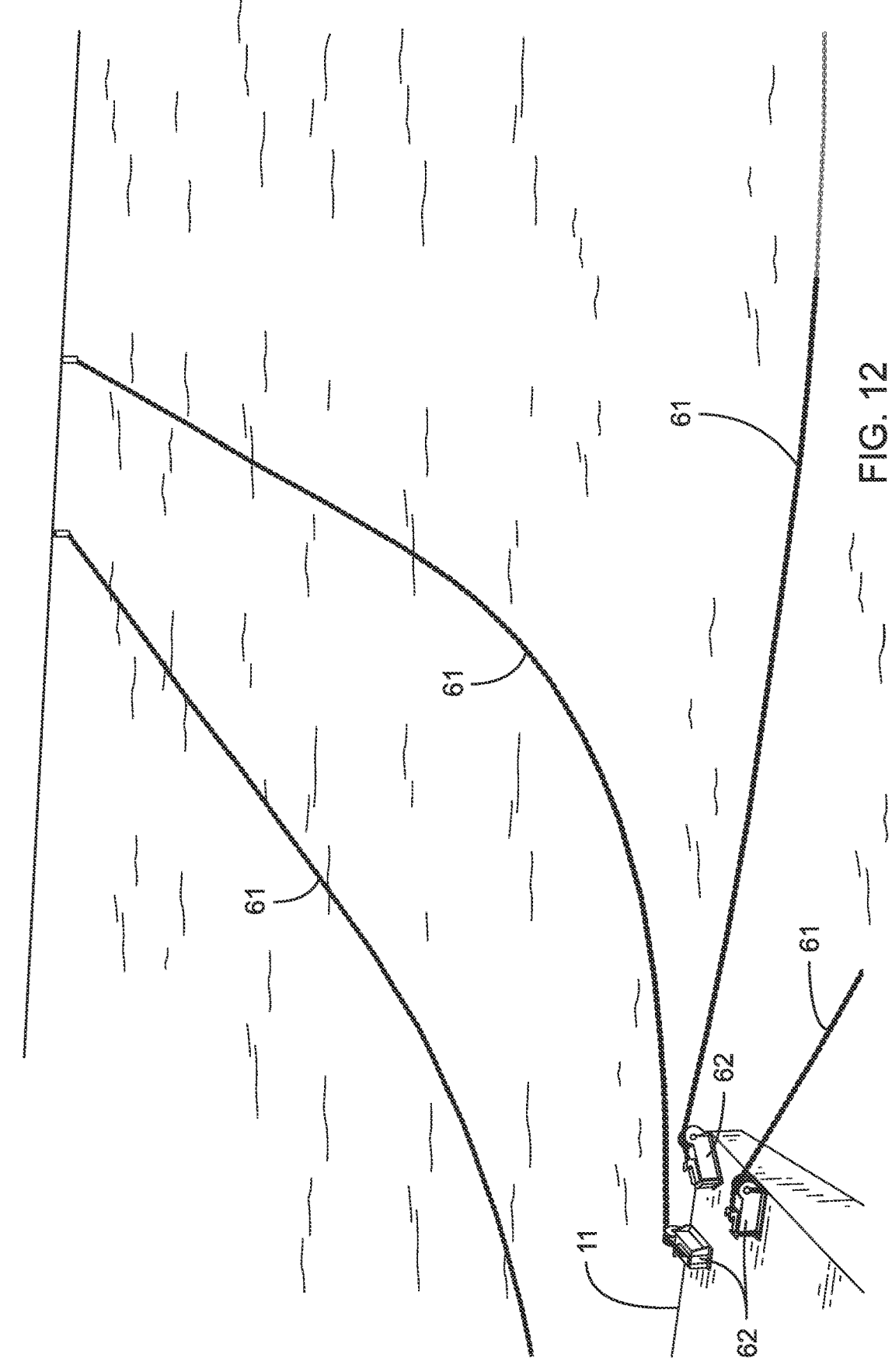
FIG. 12 is a fragmentary perspective view of a preferred embodiment of the apparatus of the present invention showing a mooring lines and winches.
Figure 13:
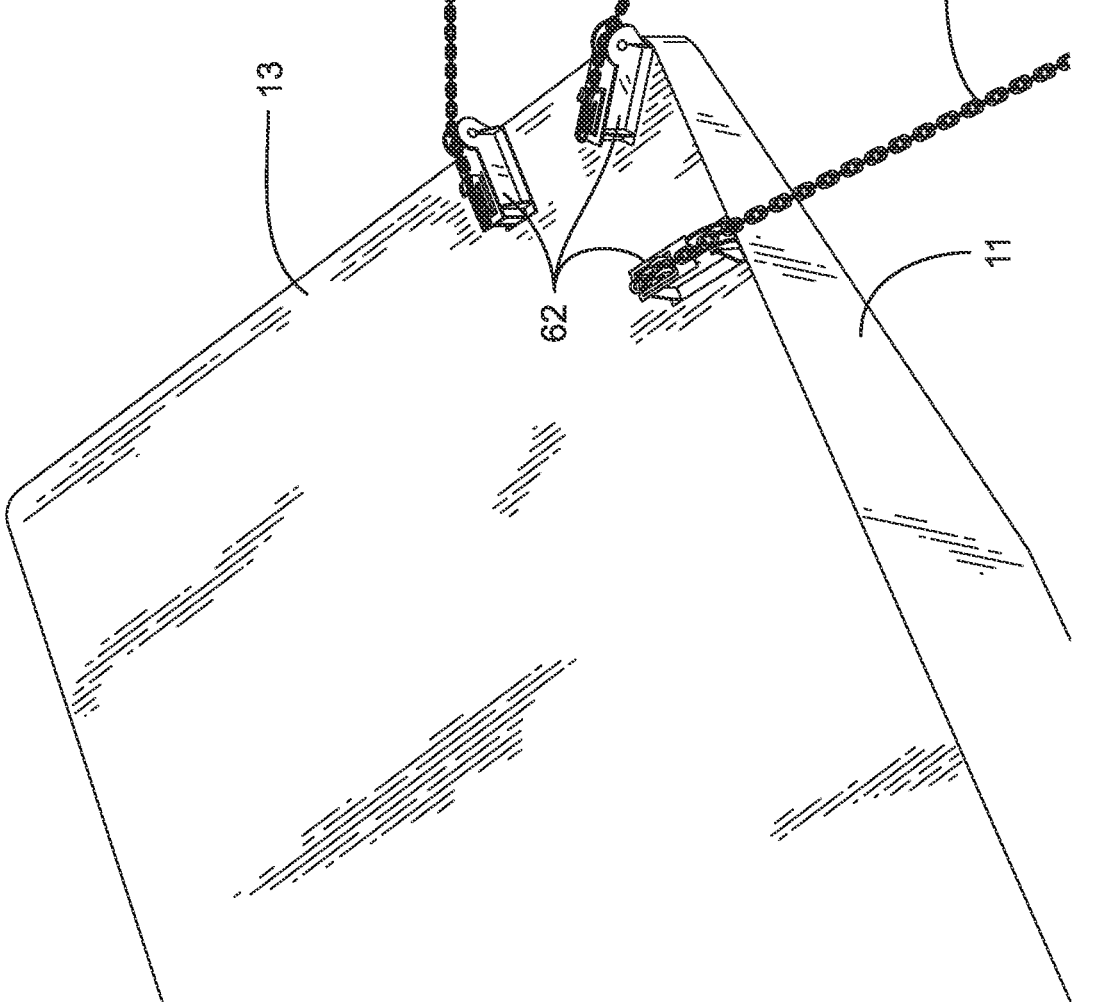
FIG. 13 is a fragmentary perspective view of a preferred embodiment of the apparatus of the present invention showing a mooring lines and winches.

In one preferred embodiment, a mooring system 60 preferably includes multiple mooring lines 61 that are preferably anchored at a first end to the seabed and at a second end to one or both of the barges 11, 12. Mooring system 60 having mooring lines 61 preferably includes connectors 62 that attach mooring lines 61 to each barge/hull section 11, 12 as seen in FIGS. 2, 12-13. Connectors 62 can include winches.

Figure 17:
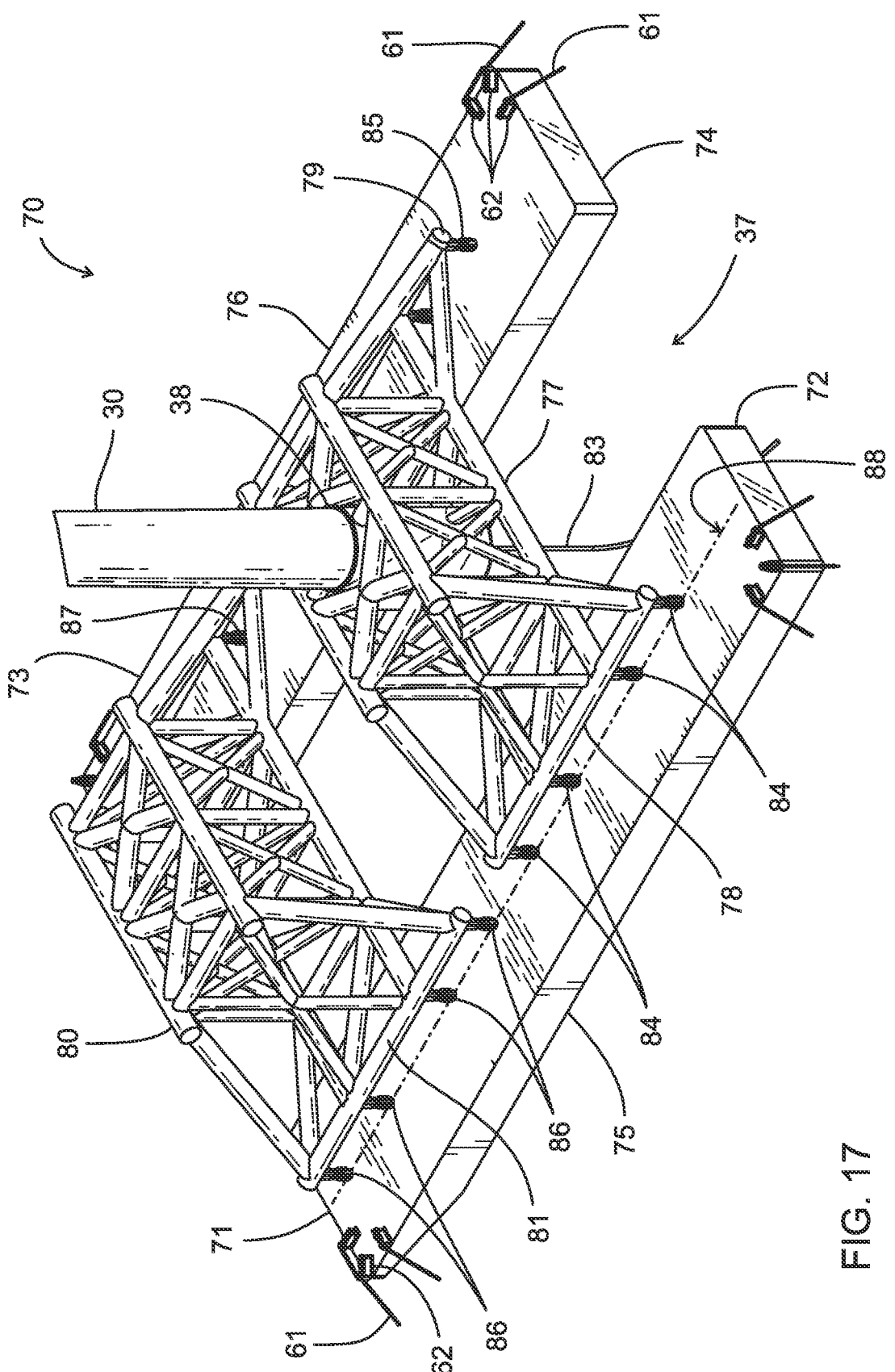
FIG. 17 is a partial perspective view of a preferred embodiment of the apparatus of the present invention illustrating gantries or frames with wide ends.
Figure 18:
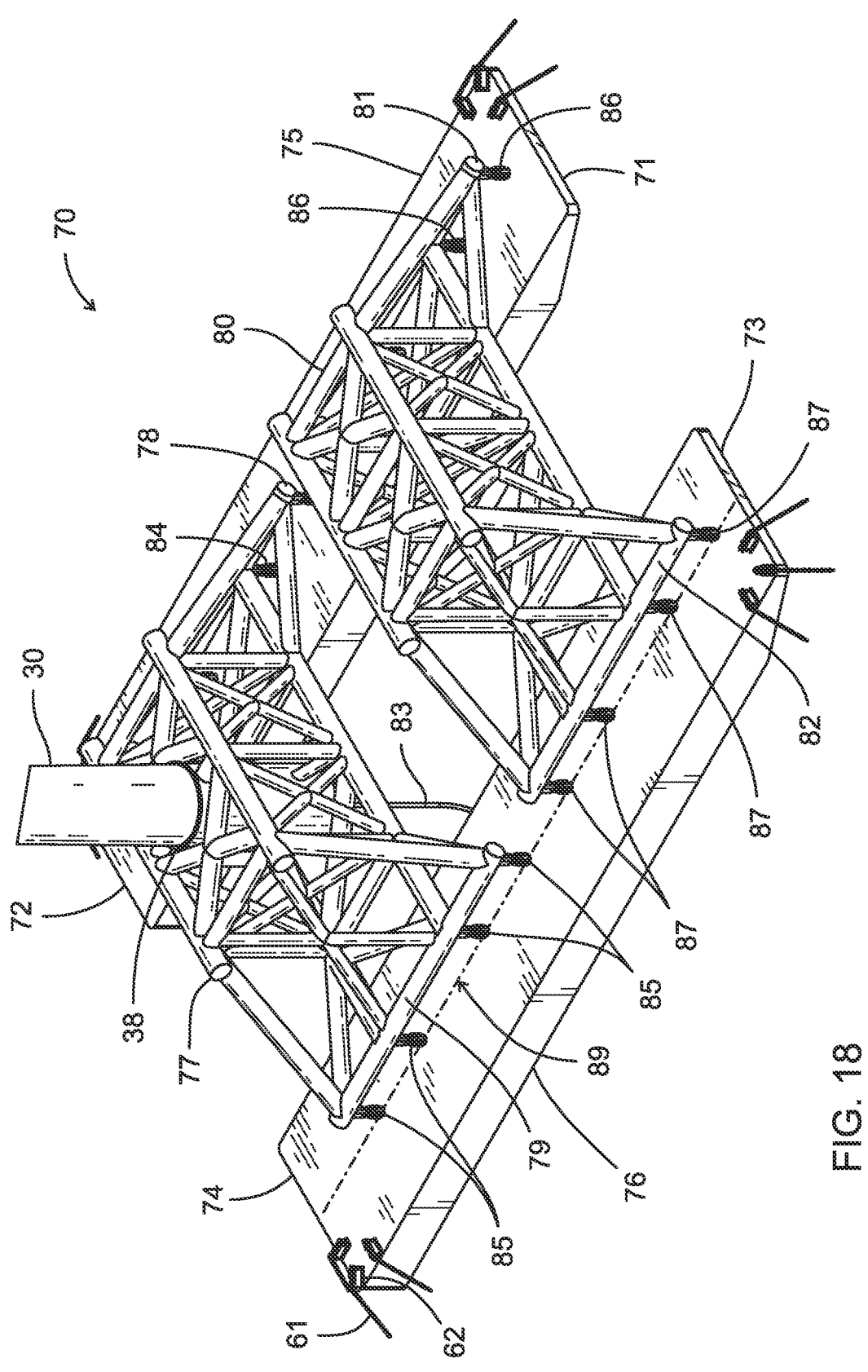
FIG. 18 is a partial perspective view of a preferred embodiment of the apparatus of the present invention illustrating gantries or frames with wide ends.

FIGS. 17-18 show another embodiment of the apparatus of the present invention designated generally by the numeral 70. Floating wind turbine apparatus 70 preferably has a pair of hulls or barges including a first hull or barge 75 and second hull or barge 76. Hull or barge 75 has bow 71 and stern 72. Hull or barge 76 has bow 73 and stern 74.

Two frames, trusses or gantries 77, 80 preferably connect to the hulls or barges 75, 76 in an arrangement that spaces the barges or hulls 75, 76 apart with a space or gap 37 in between while also spacing the frames 77, 80 apart as seen in FIGS. 17-18. The frames include first frame 77 with end portions 78, 79 and second frame 80 with end portions 81, 82. End portions 78, 79 of frame 77 can both be wider end portions. End portions 81, 82 of frame 80 can be both be wider end portions. Hulls 75, 76 and frames 77, 80 preferably form a catamaran like floating structure that supports wind turbine T. In one preferred embodiment, the turbine T tower or column 30 connects to large tubular member 38 that is a part of truss 77 as seen in FIGS. 17-18 and as with the embodiments of FIG. 1-10.

Connections 84, 85, 86, 87 form an interface between hulls 75, 76 and frames 77, 80. All four connections 84, 85, 86, 87 can be pinned or uniaxial pinned connections.

In FIGS. 17 and 18, the connections 84, 85, 86, 87 can be a plurality of pinned or uniaxial pinned connections (e.g., four (4)) that share a common axis. The common axis can be the longitudinal center line 88, 89 of each barge or hull 75, 76. Barge or hull 75 can have longitudinal center line 88. Barge or hull 76 can have longitudinal center line 89.

Frames, trusses or gantries 77, 80 can be of welded steel construction, preferably having horizontal or lateral members, vertical or longitudinal members, upper and lower horizontal members, transverse members, inclined diagonal members, upper diagonal members, and a transverse beam as with the embodiments of FIGS. 1-10.

Figure 19:
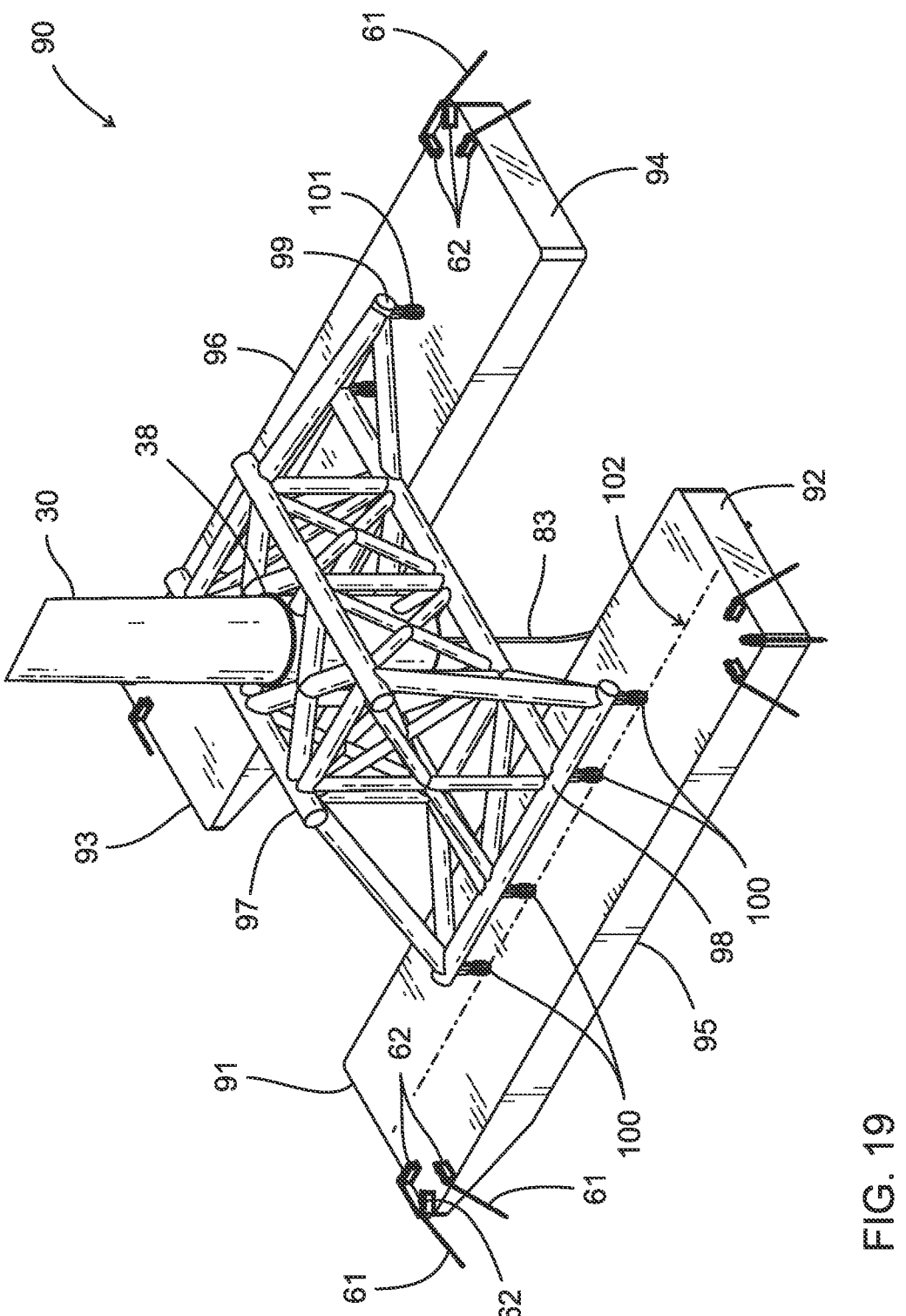
FIG. 19 is a partial perspective view of a preferred embodiment of the apparatus of the present invention illustrating a single gantry or frame with wide ends.
Figure 20:
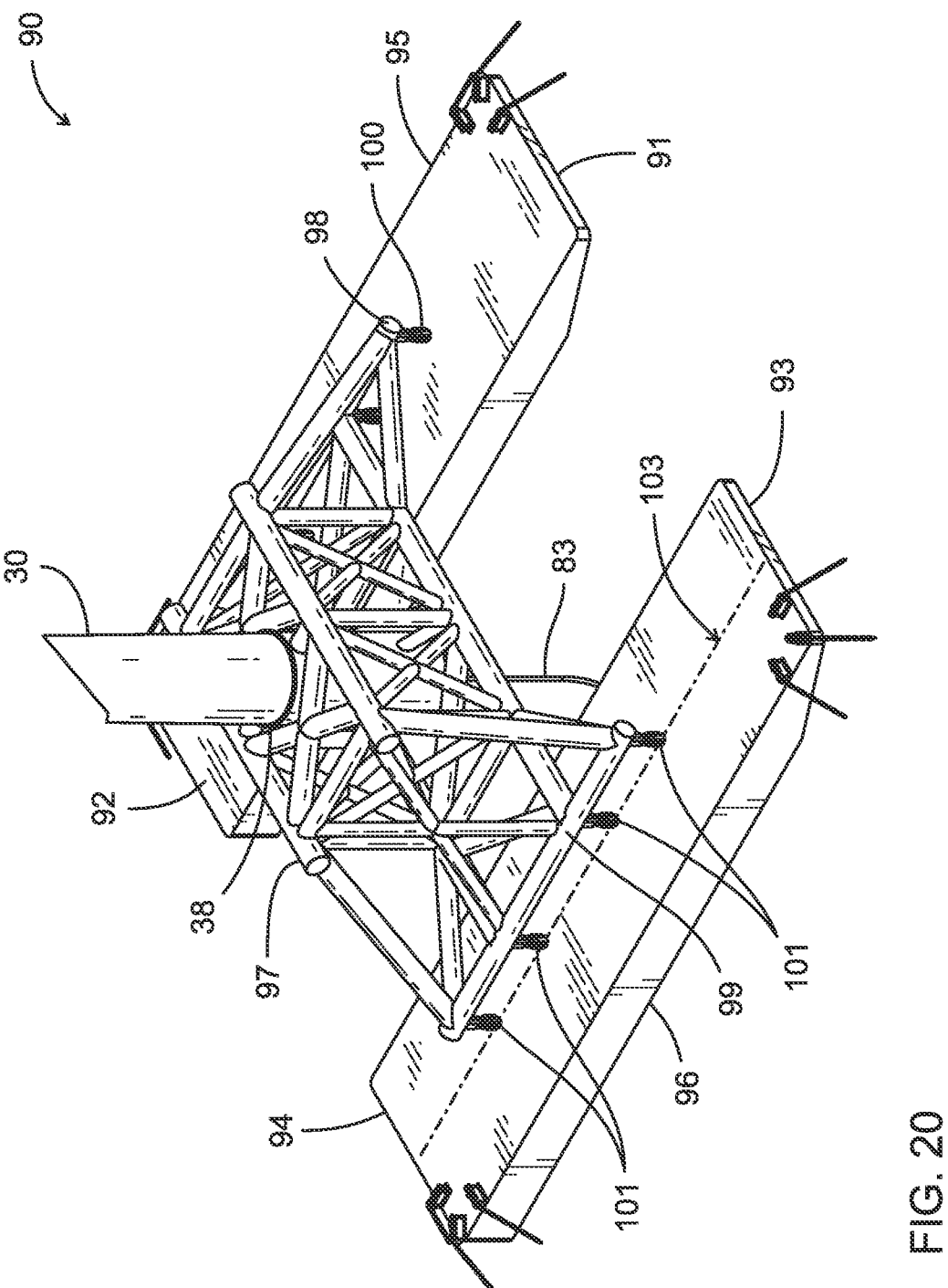
FIG. 20 is a partial perspective view of a preferred embodiment of the apparatus of the present invention illustrating a single gantry or frame with wide ends.
Figure 21:
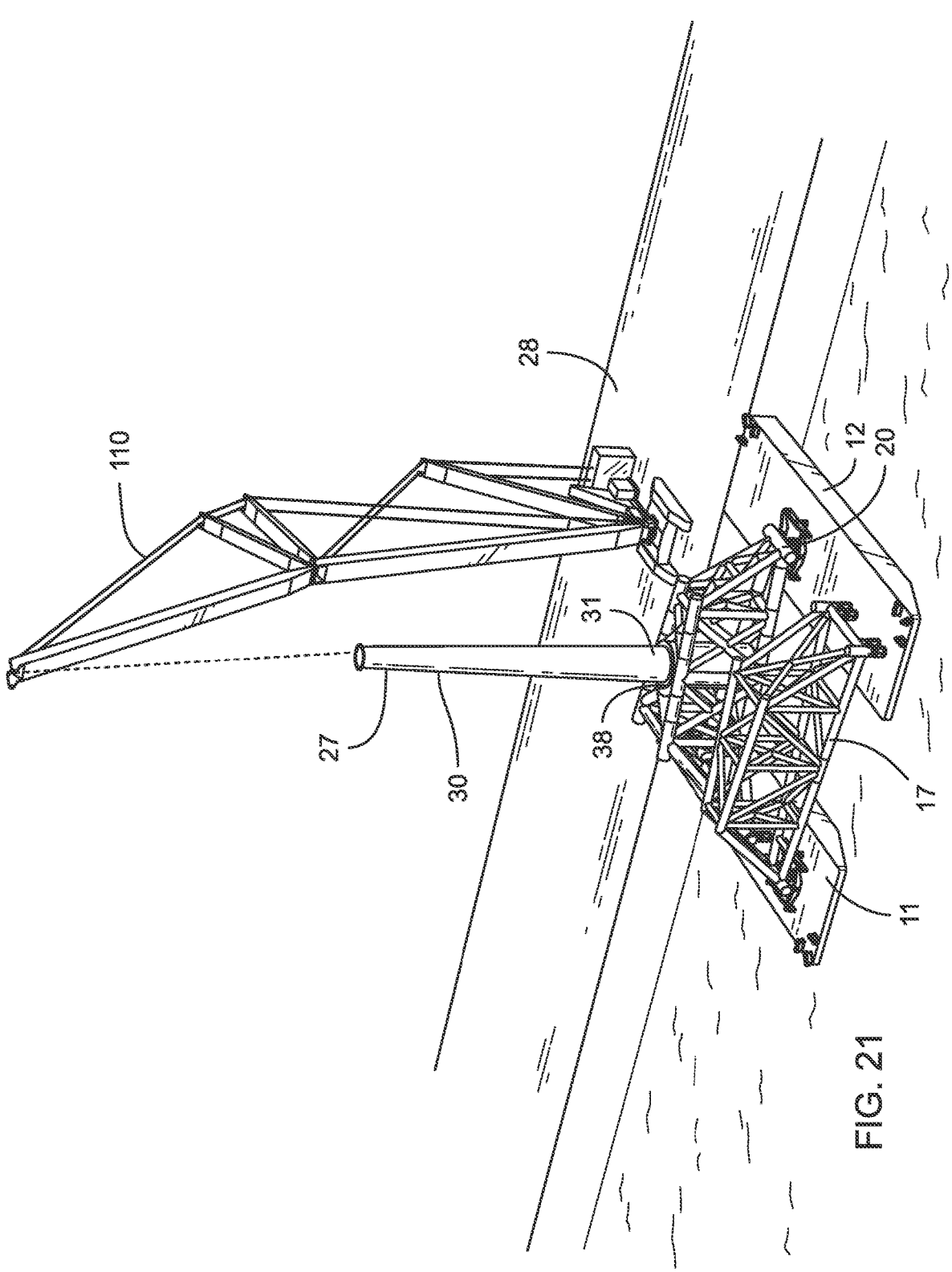
FIG. 21 is a perspective view of a preferred embodiment of the method and apparatus of the present invention illustrating a land based crawler crane installing a wind turbine post.
Figure 22:
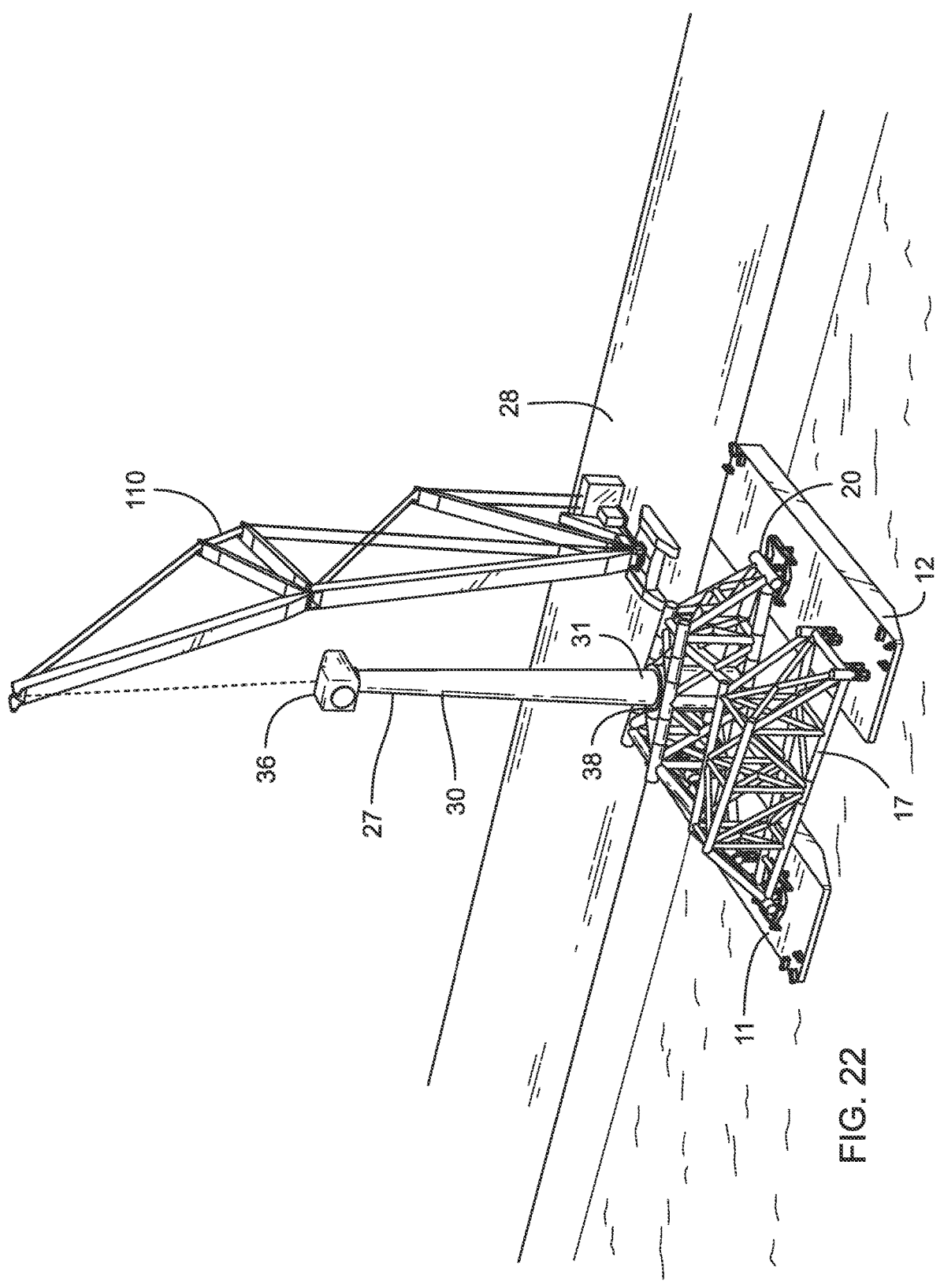
FIG. 22 is a perspective view of a preferred embodiment of the method and apparatus of the present invention illustrating a land based crawler crane installing a wind turbine motor.
Figure 23:
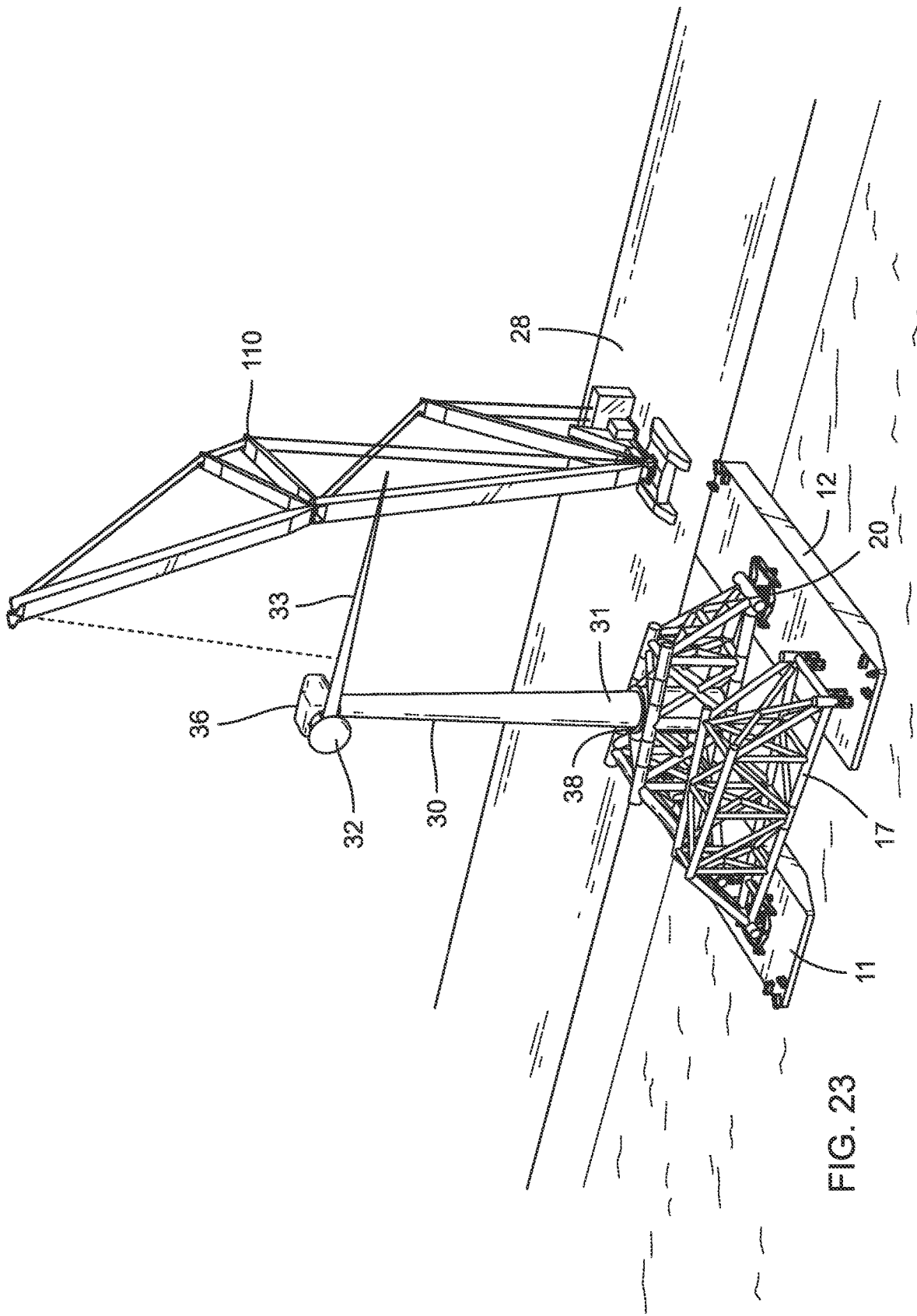
FIG. 23 is a perspective view of a preferred embodiment of the method and apparatus of the present invention illustrating a land based crawler crane installing a wind turbine blade.
Figure 24:
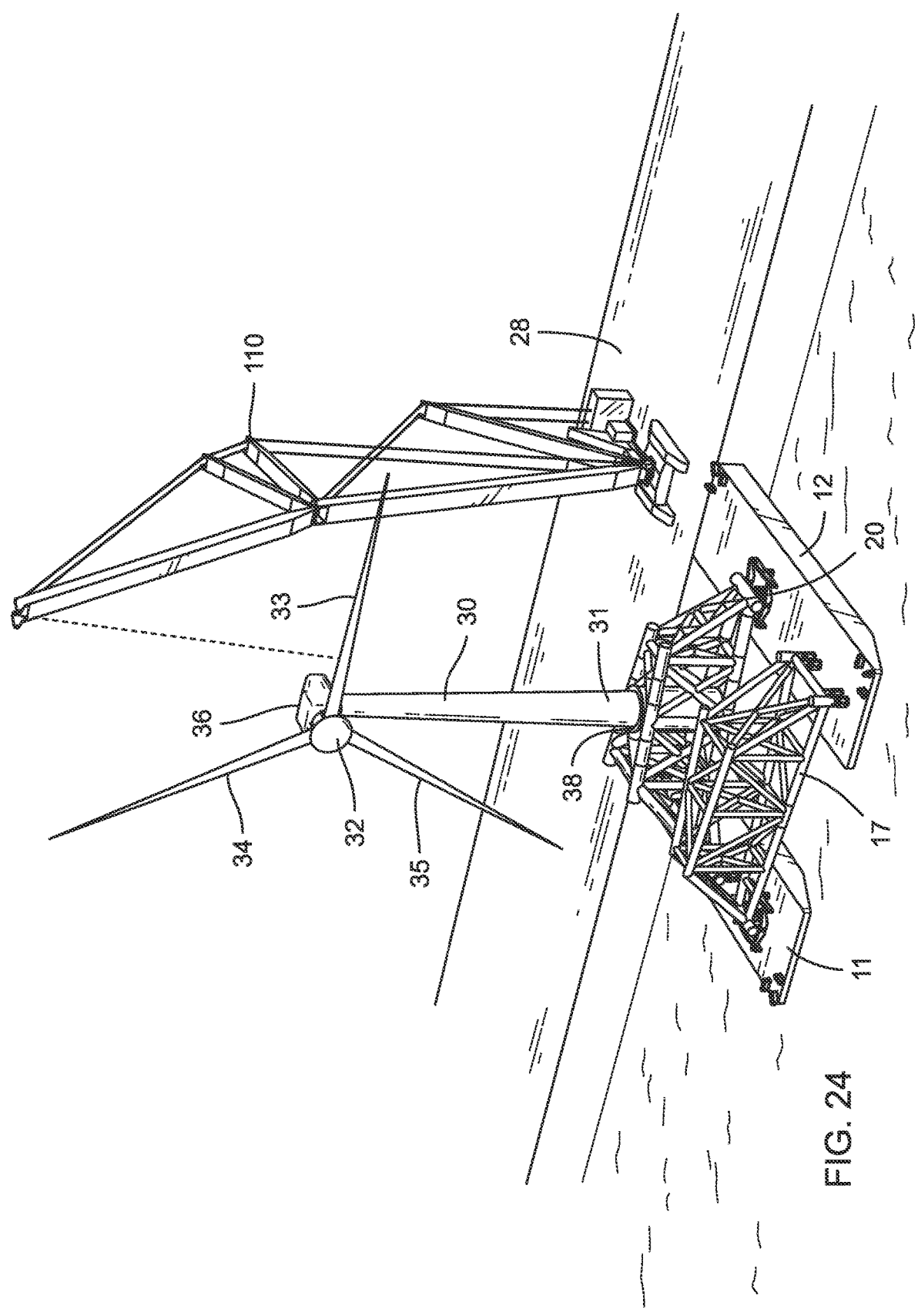
FIG. 24 is a perspective view of a preferred embodiment of the method and apparatus of the present invention illustrating a land based crawler crane installing wind turbine blades.
Figure 25:
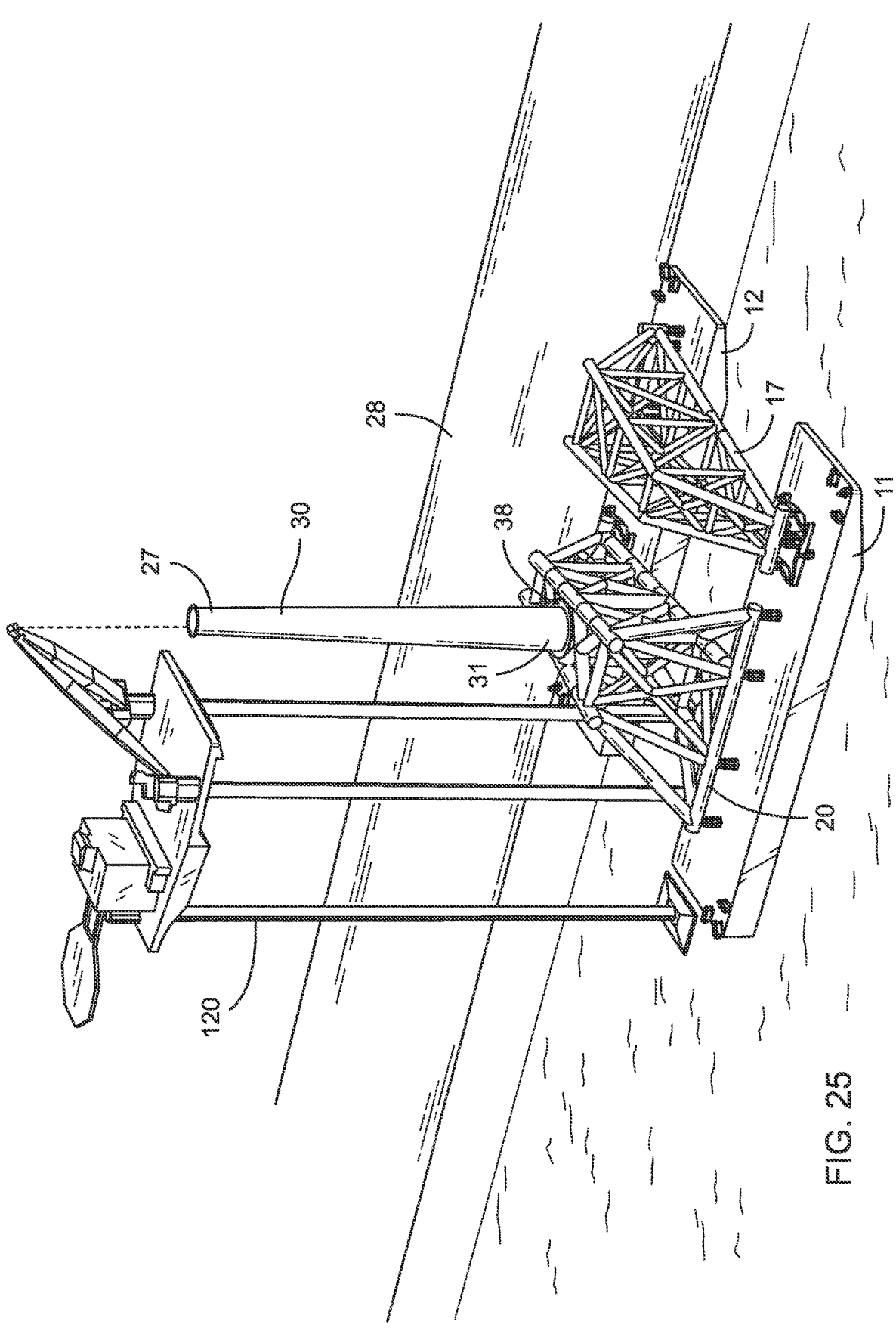
FIG. 25 is a perspective view of a preferred embodiment of the method and apparatus of the present invention illustrating a jack-up lift vessel installing a wind turbine post.
Figure 26:
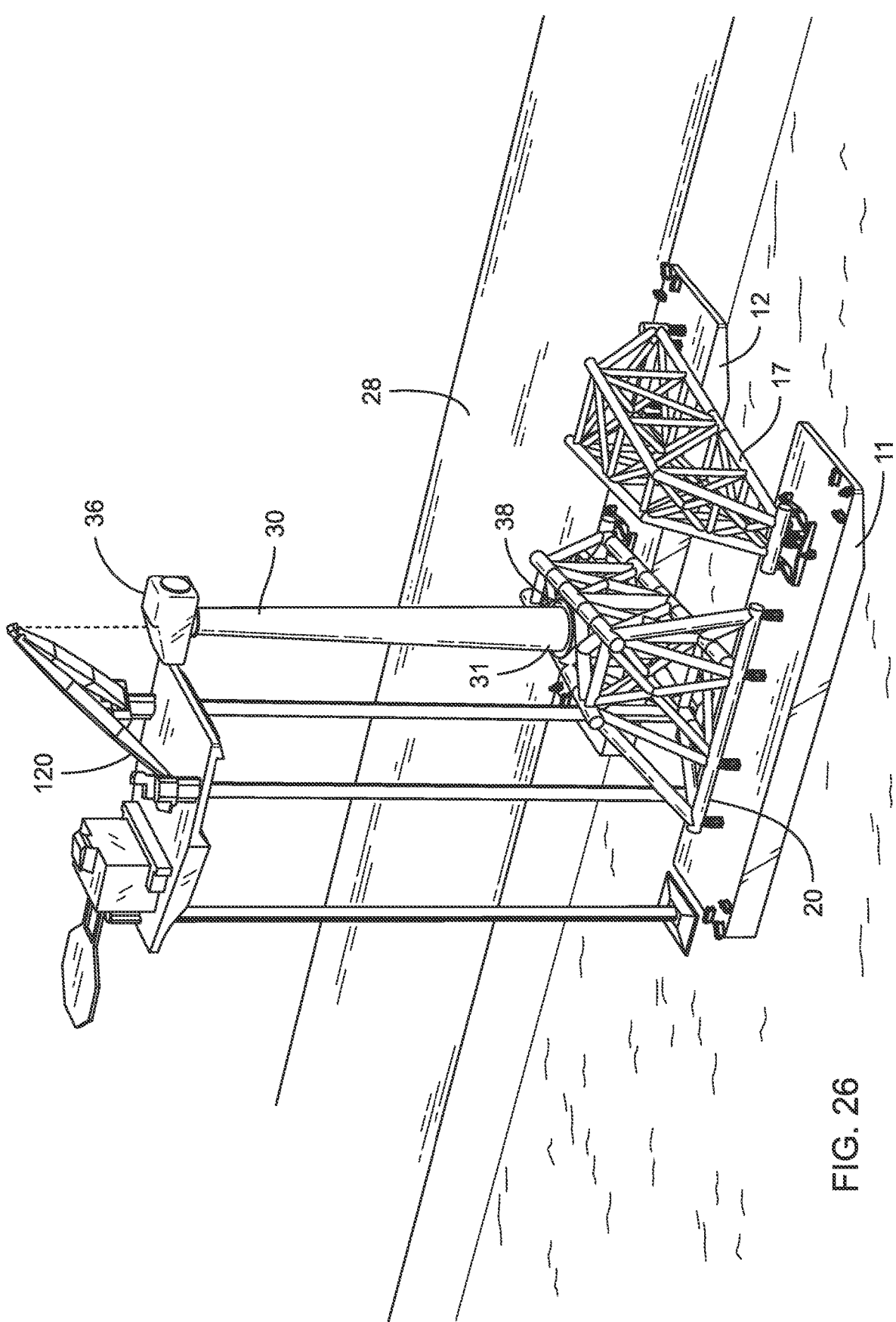
FIG. 26 is a perspective view of a preferred embodiment of the method and apparatus of the present invention illustrating a jack-up lift vessel installing a wind turbine motor.
Figure 27:
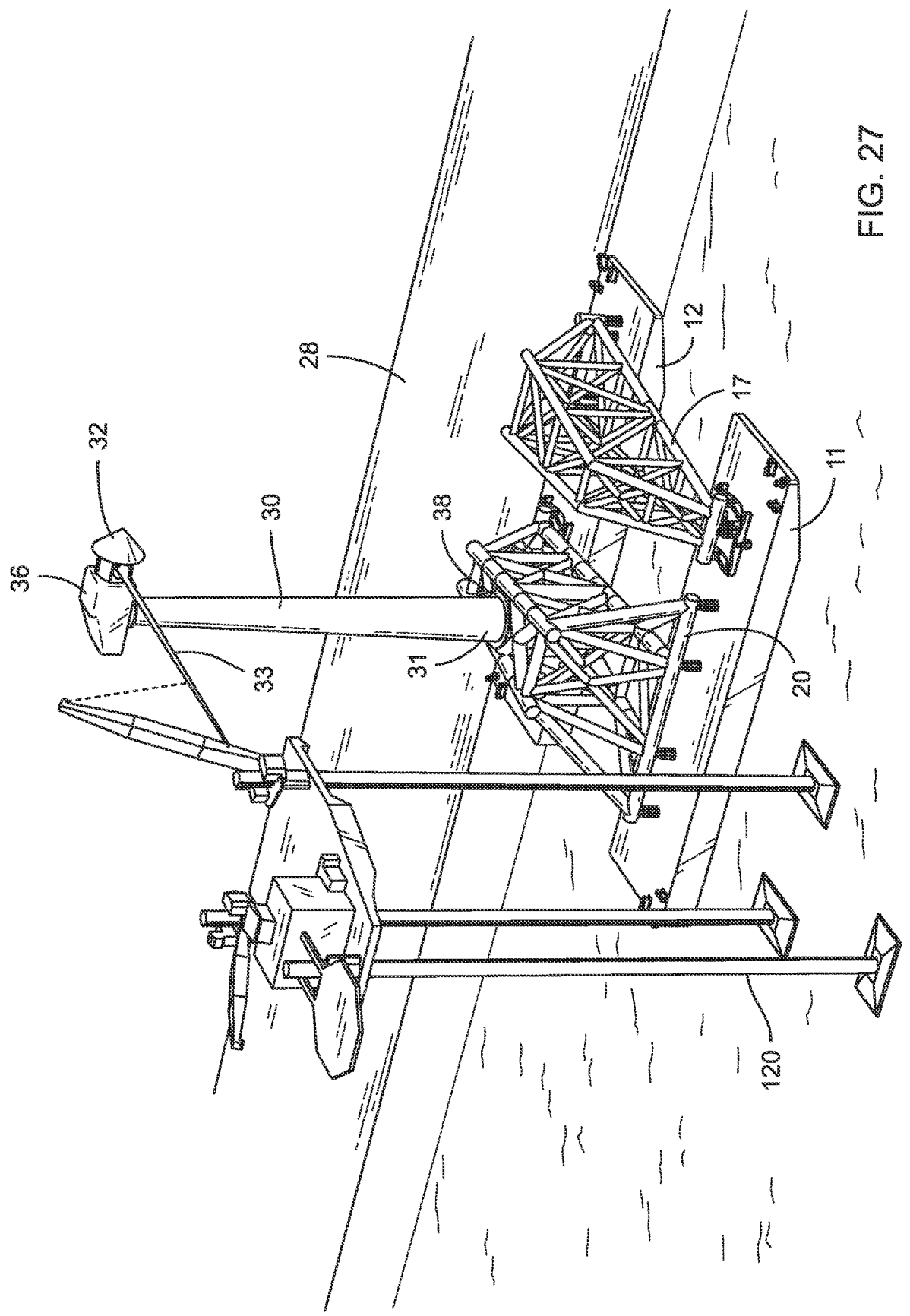
FIG. 27 is a perspective view of a preferred embodiment of the method and apparatus of the present invention illustrating a jack-up lift vessel installing a wind turbine blade.
Figure 28:
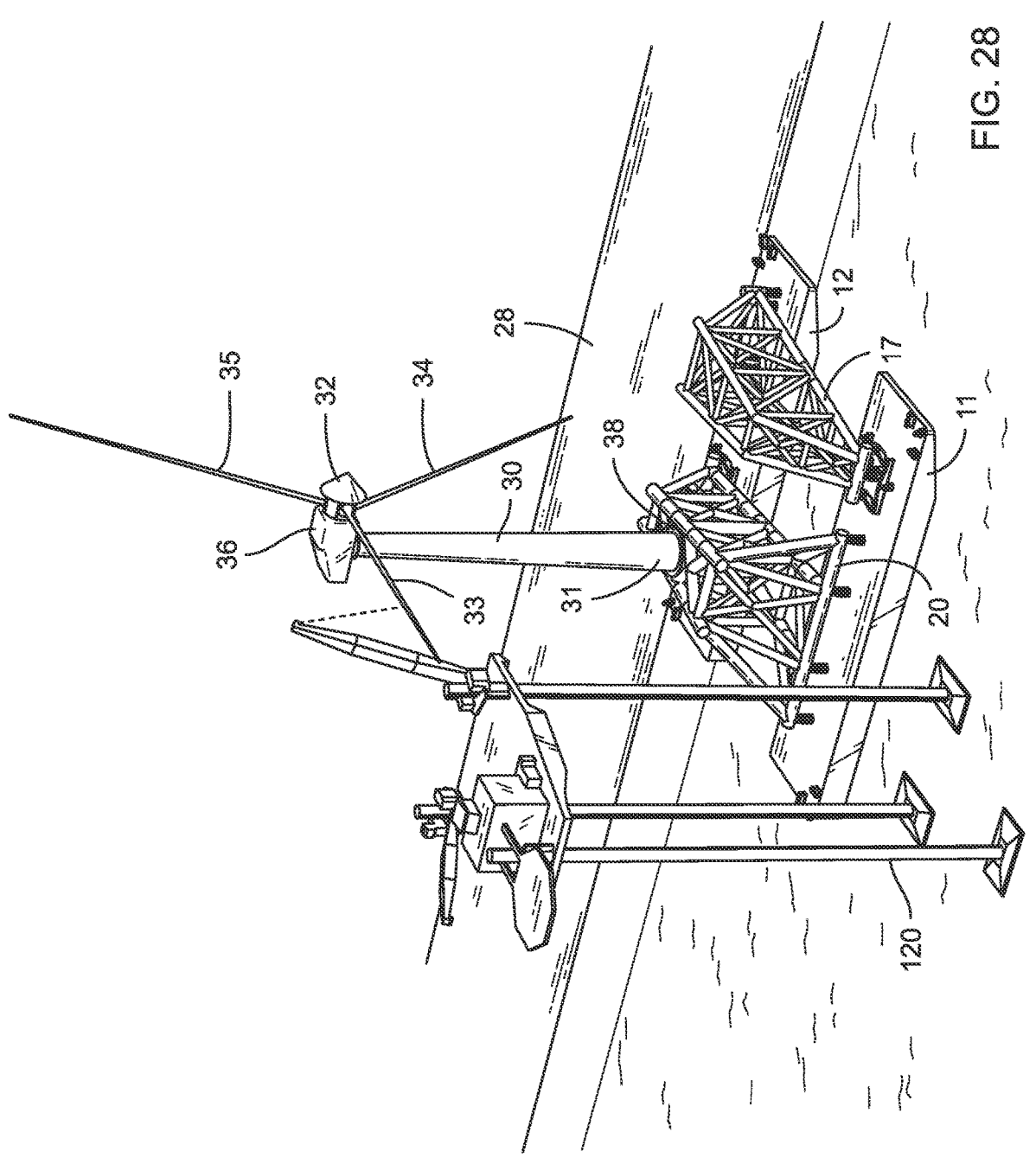
FIG. 28 is a perspective view of a preferred embodiment of the method and apparatus of the present invention illustrating a jack-up lift vessel installing wind turbine blades.
Figure 29:
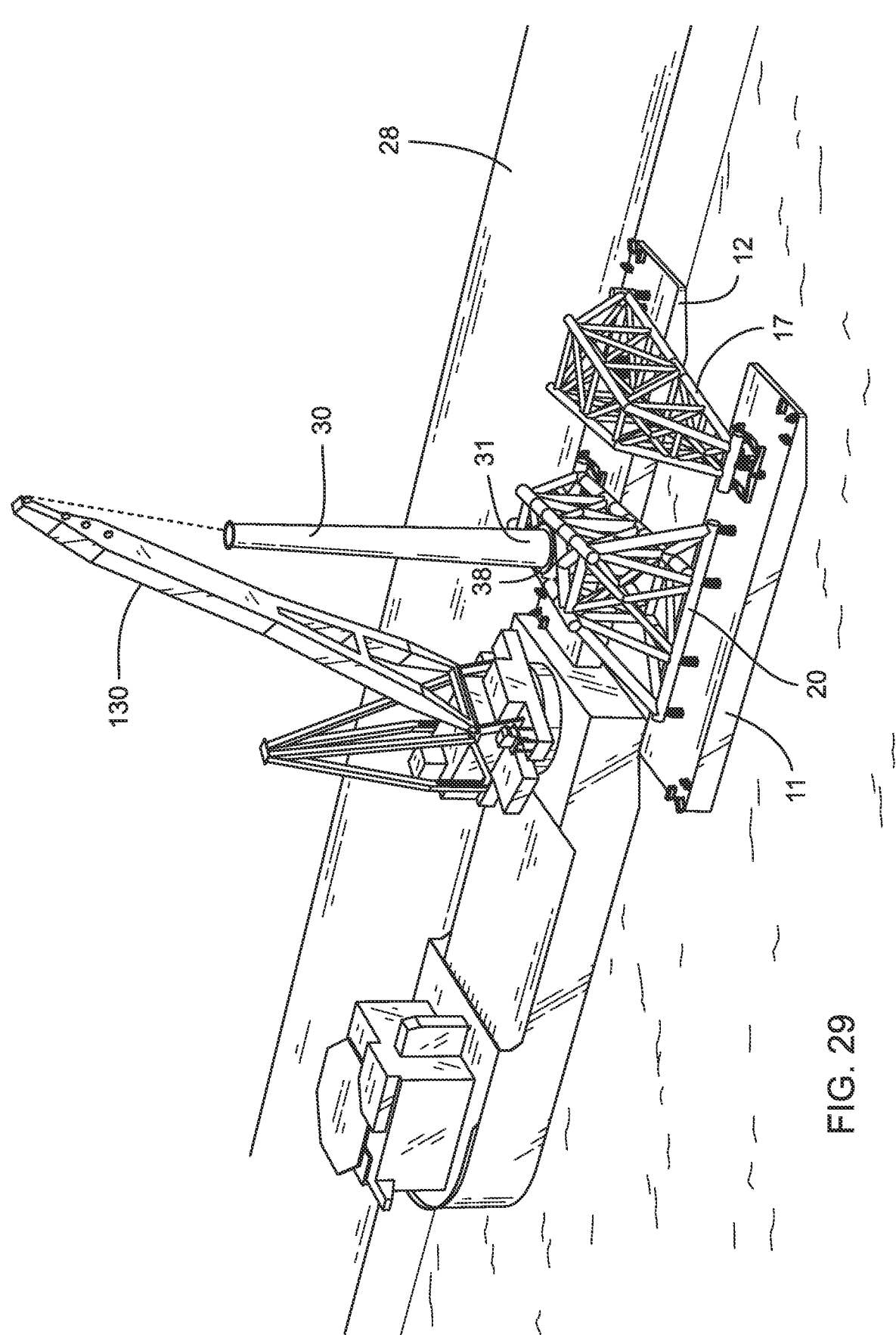
FIG. 29 is a perspective view of a preferred embodiment of the method and apparatus of the present invention illustrating a floating crane barge/lift vessel installing a wind turbine post.
Figure 30:
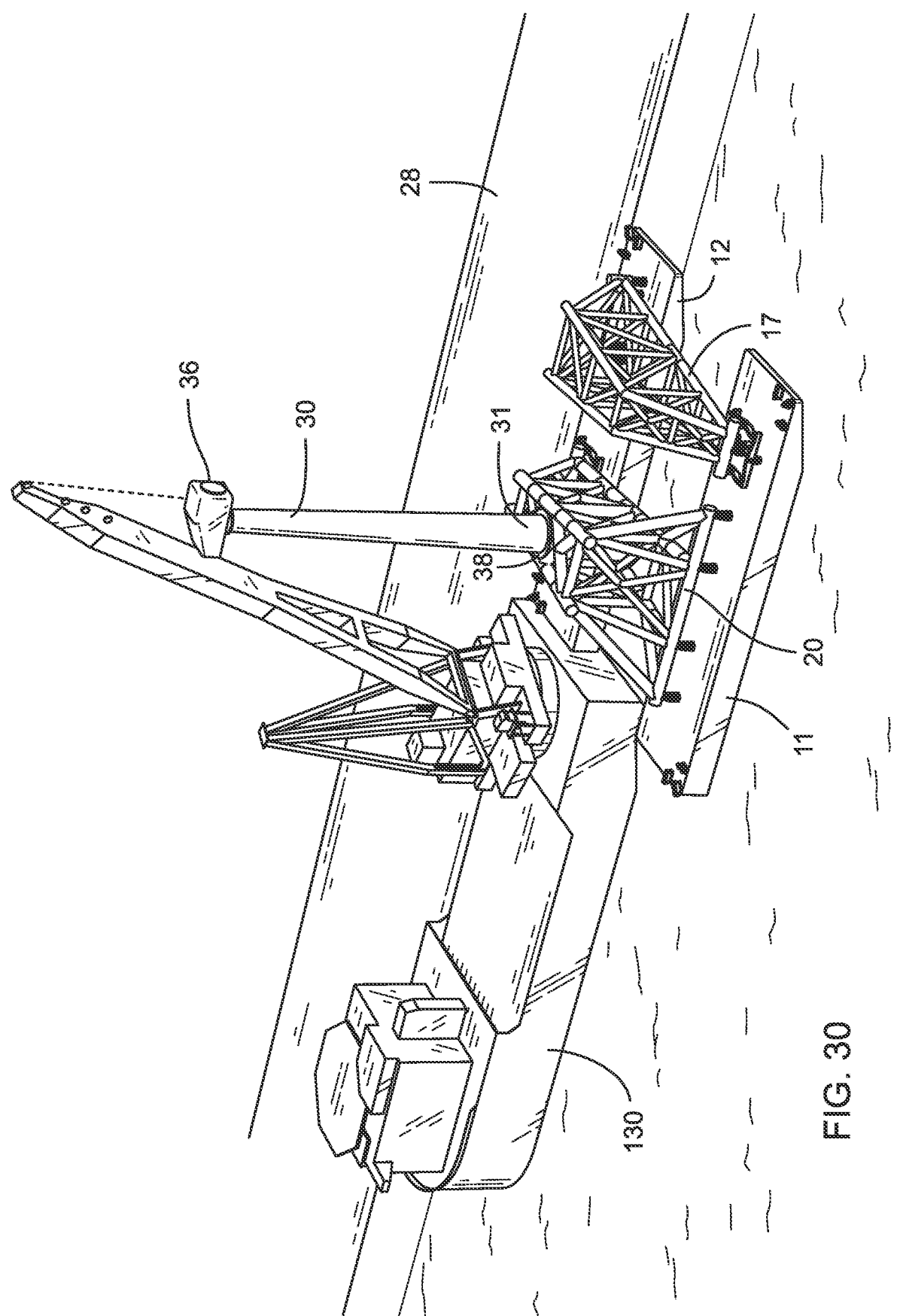
FIG. 30 is a perspective view of a preferred embodiment of the method and apparatus of the present invention illustrating a floating crane barge/lift vessel installing a wind turbine motor.
Figure 31:
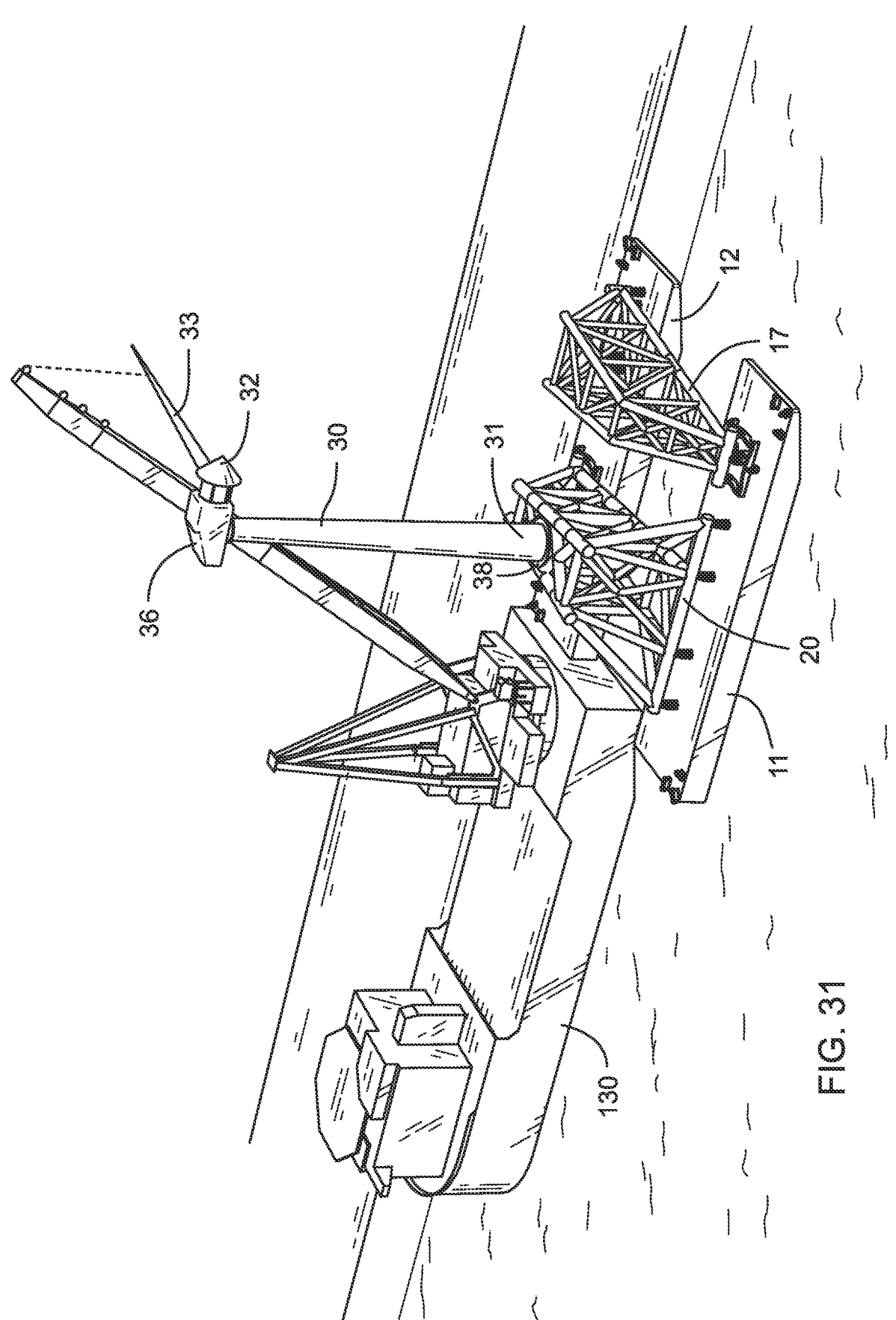
FIG. 31 is a perspective view of a preferred embodiment of the method and apparatus of the present invention illustrating a floating crane barge/lift vessel installing a wind turbine blade.
Figure 32:
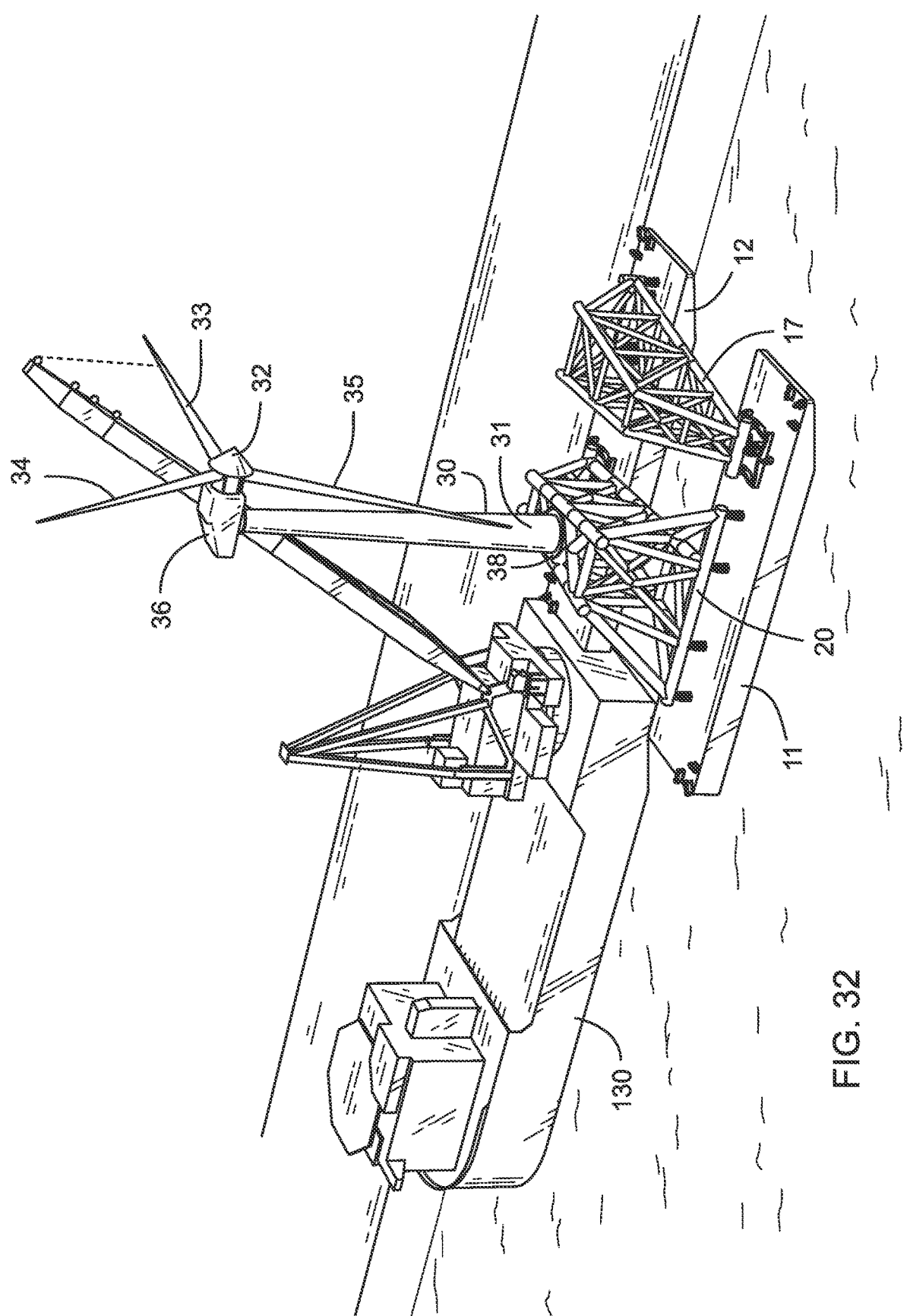
FIG. 32 is a perspective view of a preferred embodiment of the method and apparatus of the present invention illustrating a floating crane barge/lift vessel installing wind turbine blades.
Figure 33:
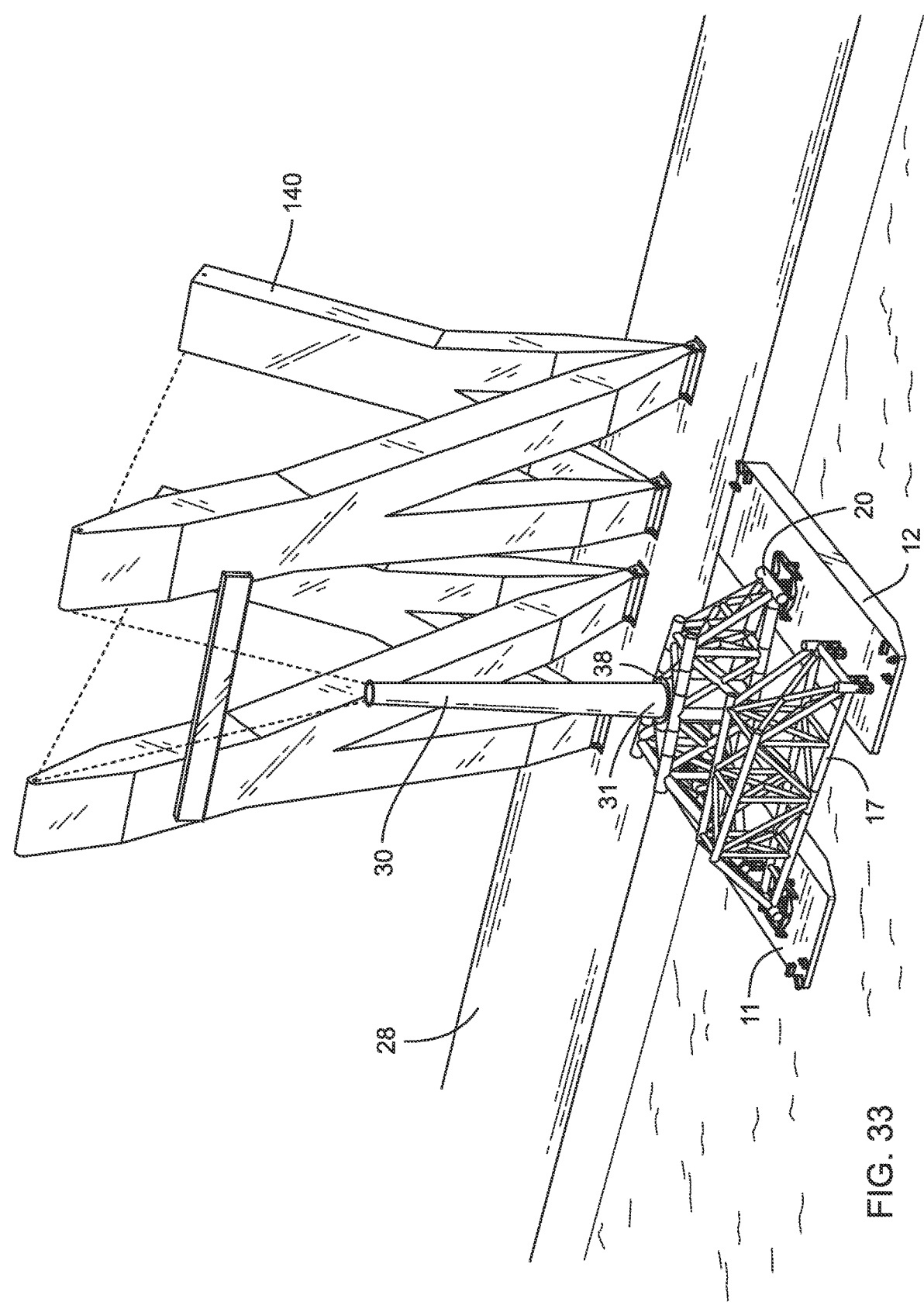
FIG. 33 is a perspective view of a preferred embodiment of the method and apparatus of the present invention illustrating a land based custom shear leg lift device installing a wind turbine post.
Figure 34:
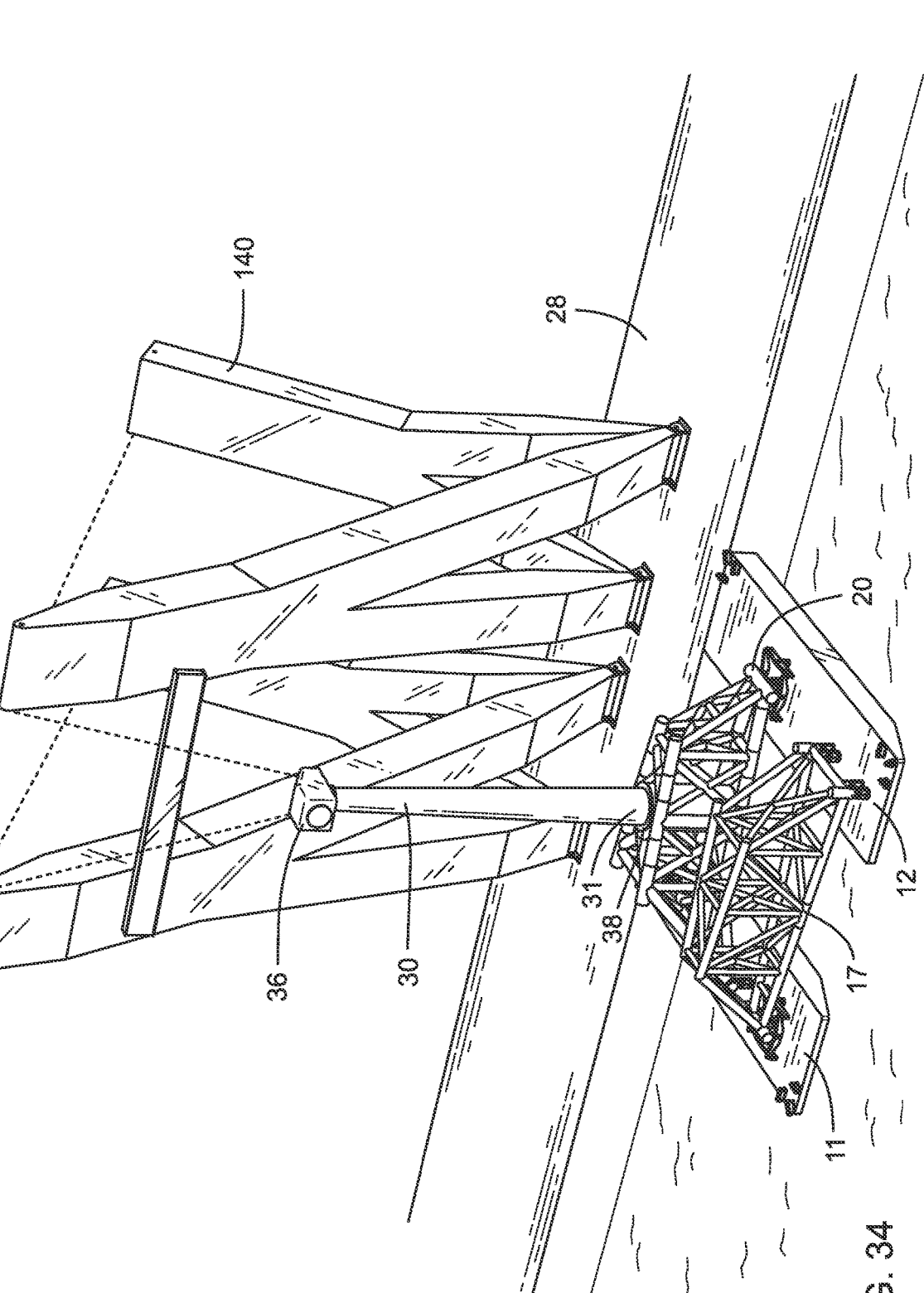
FIG. 34 is a perspective view of a preferred embodiment of the method and apparatus of the present invention illustrating a land based custom shear leg lift device installing a wind turbine motor.
Figure 35:
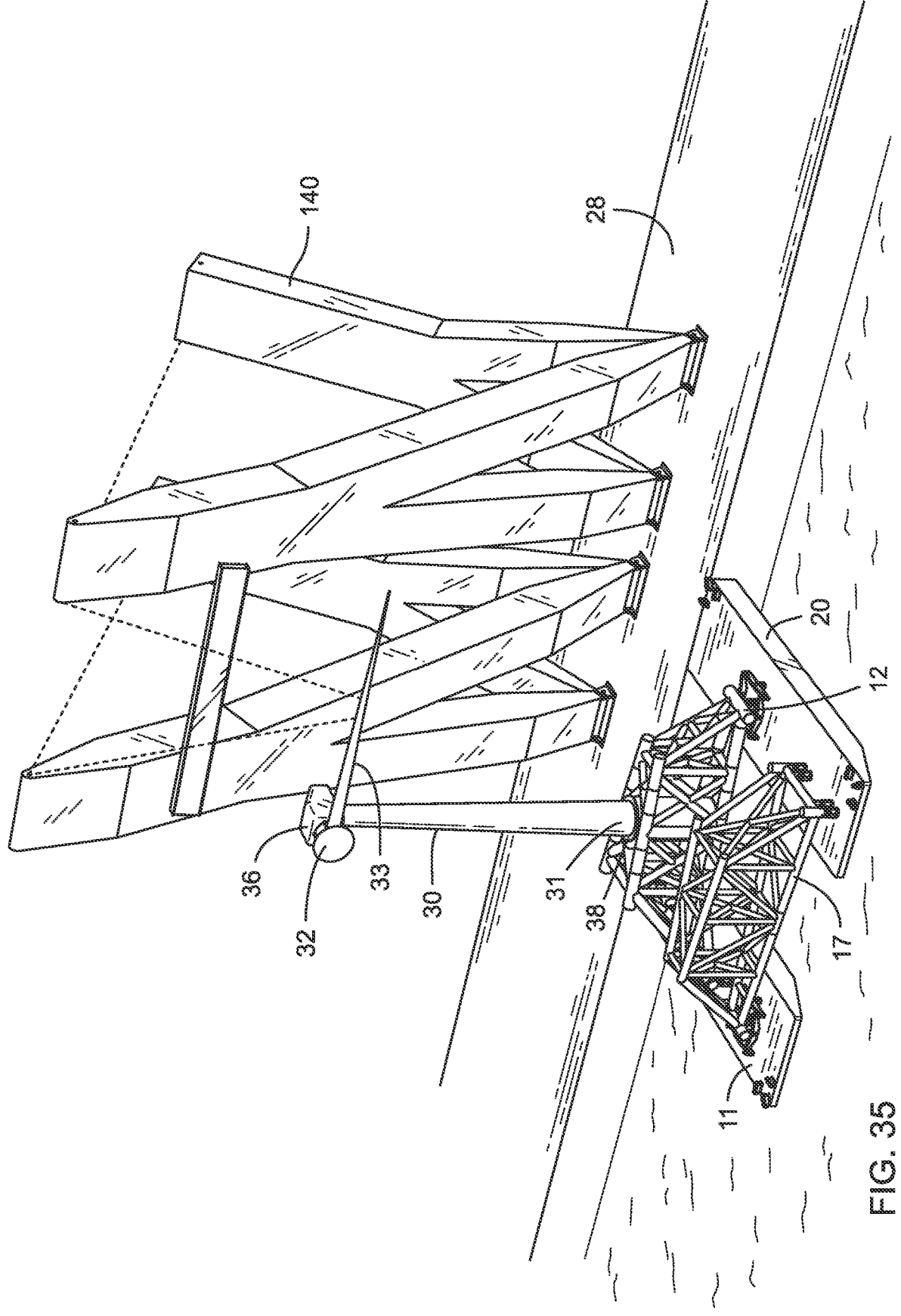
FIG. 35 is a perspective view of a preferred embodiment of the method and apparatus of the present invention illustrating a land based custom shear leg lift device installing a wind turbine blade.
Figure 36:
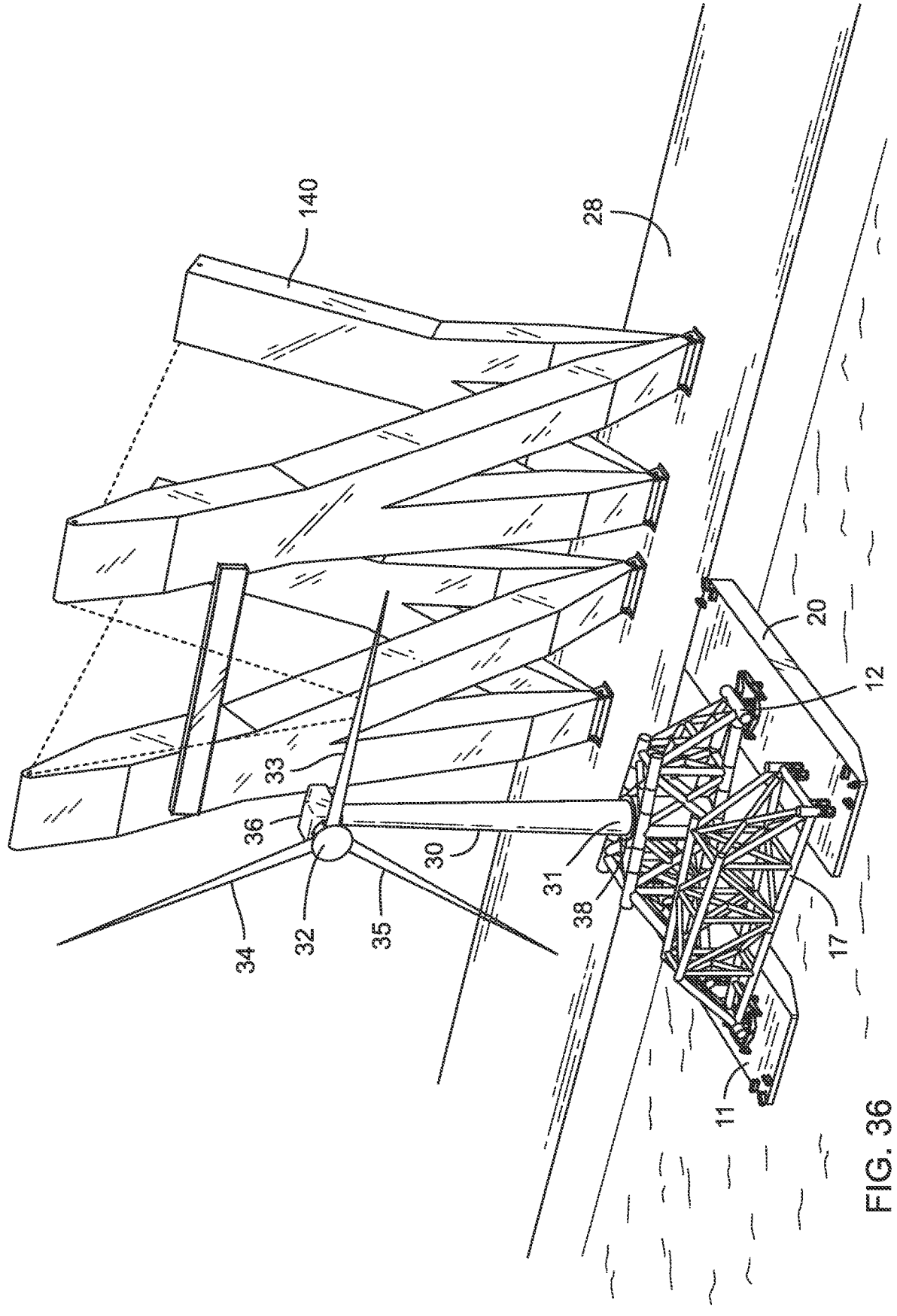
FIG. 36 is a perspective view of a preferred embodiment of the method and apparatus of the present invention illustrating a land based custom shear leg lift device installing a wind turbine blades.

FIGS. 19-20 show another embodiment of the apparatus of the present invention designated generally by the numeral 90. Floating wind turbine apparatus 90 preferably has a pair of hulls or barges including a first hull or barge 95 and second hull or barge 96. Hull or barge 95 has bow 91 and stern 92. Hull or barge 96 has bow 93 and stern 94.

A single frame, truss or gantry 97 preferably connect to the hulls or barges 95, 96 in an arrangement that spaces the barges or hulls 95, 96 apart with a space or gap 37 in between as seen in FIGS. 19-20. Frame 97 has end portions 98, 99. End portions 98, 99 of frame 97 can both be wider end portions. Hulls 95, 96 and frame 97 preferably form a catamaran like floating structure that supports wind turbine T. In one preferred embodiment, the turbine T tower or column 30 connects to large tubular member 38 that is a part of truss 97 as seen in FIGS. 19-20 and as with the embodiments of FIG. 1-10.

Connections 100, 101 form an interface between hulls 95, 96 and frame 97. All connections 100, 101 can be pinned or uniaxial pinned connections.

In FIGS. 19 and 20, the connections 100, 101 can be a plurality of pinned or uniaxial pinned connections (e.g., four (4)) that share a common axis. The common axis can be longitudinal center lines 102, 103 of each barge or hull 95, 96. Barge or hull 95 has longitudinal center line 102. Barge or hull 96 has longitudinal center line 103. Frame, truss or gantry 97 thus pivots about axis 102 relative to barge or hull 95. Similarly, frame, truss or gantry 97 pivots about axis 103 relative to barge or hull 96.

As with the embodiments of FIGS. 1-10, frame 97 can be of welded steel construction, preferably having horizontal or lateral members, vertical or longitudinal members, upper and lower horizontal members, transverse members, inclined diagonal members, upper diagonal members, and a transverse beam.

A preferred embodiment of the present invention includes a method of installing an offshore floating wind turbine apparatus 10 as seen in FIGS. 21-36. At a first location, the method preferably attaches components of a wind turbine tower T to a frame section of a floating catamaran structure that includes first and second spaced apart hull sections 11, 12 and first and second spaced apart frames 17, 20, wherein the tower T has a tower lower end with a base 31 that can be attached to one of the frame sections 17, 20 (for example at tubular member 38).

Tower T can include the same components shown in FIGS. 1-20, including blades 33, 34, 35, nacelle 36 and hub 32. Blades 33, 34, 35, nacelle 36 and hub 32 are preferably added to the tower T at a tower upper end portion 27.

The floating catamaran structure 10 can travel from land 28, such as for example a harbor or inland waterway, over water to a second location that can be an offshore marine location. The hull sections 11, 12 can be moored with mooring lines or cables 61 to the seabed at the second location. Electricity is then preferably generated at the second location with wind turbine T.

A method of the present invention employs one or more land based lifting devices 110, 120, 130, 140 that can lift each of the components of tower T and place them on a frame 17, 20 that is supported by the hull sections 11, 12. The land based lifting devices can be one or more of the following: a land based crawler crane 110, jack-up lift vessel 120, floating crane barge/lift vessel 130, and/or land based custom shear leg lift device 140.

Wind turbine T can be assembled on or near land 28 before travel to the second location (for example marine or offshore location). As seen in FIG. 21-24, land based crawler crane 110 can attach post 30, nacelle 36, blades 33, 34, 35 and hub 32 to frame 20 at a first location. As seen in FIG. 25-28, jack-up lift vessel 120 can attach post 30, nacelle 36, blades 33, 34, 35 and hub 32 to frame 20 at a first location. As seen in FIG. 29-32, floating crane barge/lift vessel 130 can attach post 30, nacelle 36, blades 33, 34, 35 and hub 32 to frame 20 at a first location. As seen in FIG. 33-36, land based custom shear leg lift device 140 can attach post 30, nacelle 36, blades 33, 34, 35 and hub 32 to frame 20 at a first location.

FIGS. 21-36 show a method of installing an offshore floating wind turbine apparatus including attaching, at a first location preferably on or near land 28, components of a wind turbine tower T to a floating catamaran structure that includes first and second spaced apart hull sections 11, 12 and one or more spaced apart frames 17, 20. Tower T can have a tower lower end with a base 31 that is preferably attached to one of the one or more frames 17, 20 (for example at tubular member 38). FIGS. 1-20 show construction of the frames 17, 20 in more detail. One or more land based lifting devices 110, 120, 130, 140 can lift components of the tower T and place them on a frame section 17, 20 that is supported by the hull sections 11, 12. Column or post 30 can be attached to a frame 17, 20 (for example at tubular member 38). Nacelle housing 36 can be attached to upper end portion 27 of column or post 30. Hub 32 and blades 33, 34, 35 can be attached to nacelle 36. Preferably, after all components of tower T are attached, floating catamaran structure 10 travels over water to a second location that can be an offshore marine location. Hull sections 11, 12 are moored via a mooring system 60 and mooring lines 61 to a seabed at the second location.

The following is a list of parts and materials suitable for use in the present invention:

PARTS LIST

| PART NO. | DESCRIPTION |
| --- | --- |
| 10 | floating wind turbine apparatus |
| 11 | fist hull/barge |
| 12 | second hull/barge |
| 13 | bow |
| 14 | stern |
| 15 | bow |
| 16 | stern |
| 17 | frame/first frame |
| 18 | frame end portion/narrow end |
| 19 | frame end portion/wide end |
| 20 | frame/second frame |
| 21 | frame end portion/wide end |
| 22 | frame end portion/narrow end |
| 23 | connection |
| 24 | connection |
| 25 | connection |
| 26 | connection |
| 27 | top/upper end |
| 28 | land |
| 30 | tower/column/wind turbine support column/post |
| 31 | base/lower end |
| 32 | hub |
| 33 | blade |
| 34 | blade |
| 35 | blade |
| 36 | nacelle/casing/housing |
| 37 | gap/space |
| 38 | tubular member/wind turbine foundation structure |
| 39 | rim |
| 40 | water surface (sea, waterway, ocean, gulf, bay) |
| 41 | lower horizontal member/lateral member |
| 42 | lower horizontal member/lateral member |
| 43 | upper horizontal member/lateral member |
| 44 | upper horizontal member/lateral member |
| 45 | vertical member/longitudinal member |
| 46 | vertical member/longitudinal member |
| 47 | vertical member/longitudinal member |
| 48 | vertical member/longitudinal member |
| 49 | vertical member/longitudinal member |
| 50 | vertical member/longitudinal member |
| 51 | transverse member |
| 52 | transverse member |
| 53 | inclined diagonal member |
| 54 | upper diagonal member |
| 55 | transverse beam |
| 60 | mooring system |
| 61 | mooring line/cable |
| 62 | connector/mooring fairlead/winch |
| 63 | center line |
| 64 | center line |
| 70 | floating wind turbine apparatus |
| 71 | bow |
| 72 | stern |
| 73 | bow |
| 74 | stern |
| 75 | port hull |
| 76 | starboard hull |
| 77 | frame/first frame/gantry |
| 78 | frame end portion/wide end |
| 79 | frame end portion/wide end |
| 80 | frame/second frame/gantry |
| 81 | frame end portion/wide end |
| 82 | frame end portion/wide end |
| 83 | turbine power export cable |
| 84 | connection |
| 85 | connection |
| 86 | connection |
| 87 | connection |
| 88 | barge/hull center line/pivotal axis |
| 89 | barge/hull center line/pivotal axis |
| 90 | floating wind turbine apparatus |
| 91 | bow |

-continued

| PART NO. | DESCRIPTION |
| --- | --- |
| 92 | stern |
| 93 | bow |
| 94 | stern |
| 95 | port hull |
| 96 | starboard hull |
| 97 | frame/gantry |
| 98 | frame end portion/wide end |
| 99 | frame end portion/wide end |
| 100 | connection |
| 101 | connection |
| 102 | barge/hull center line/pivotal axis |
| 103 | barge/hull center line/pivotal axis |
| 110 | land based crawler crane |
| 120 | jack-up lift vessel |
| 130 | floating crane barge/lift vessel |
| 140 | land based custom shear leg lift device |
| T | wind turbine |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An offshore floating wind turbine apparatus comprising:

a) first and second spaced apart hull sections with a space between said hull sections;

b) first and second gantries that each connect to said hull sections, said gantries including a first gantry and a second gantry that are spaced apart, each connected to a said hull section with a pivotal or universal joint connection;

c) a wind turbine tower having upper and lower end portions;

d) said wind turbine tower lower end portion mounted to said first but not to said second gantry so that the wind turbine is able to move relative to said second gantry responsive to wave action;

e) the wind turbine tower upper end portion having a rotor, hub, and blades; and f) a mooring system that holds said hull sections on a desired location.

2. The offshore floating wind turbine apparatus of claim 1 wherein at least one of said gantries is a truss.

3. The offshore floating wind turbine apparatus of claim 2 wherein the truss includes a tubular member wherein the turbine tower connects to the tubular member.

4. The offshore floating wind turbine apparatus of claim 1 wherein the mooring system includes multiple mooring lines that are anchored at one end to a seabed and at a second end to one or both of said hull sections.

5. The offshore floating wind turbine apparatus of claim 1 wherein at least one gantry has a wider end and a narrower end.

6. The offshore floating wind turbine apparatus of claim 1 wherein one hull section is longer than the other hull section.

7. The offshore floating wind turbine apparatus of claim 1 wherein the mooring system includes multiple mooring legs.

8. The offshore floating wind turbine apparatus of claim 7 wherein the mooring system includes connections to each hull section.

9. The offshore floating wind turbine apparatus of claim 1 wherein the tower lower end attaches to a said gantry at a position that is in between said hull sections.

10. The offshore floating wind turbine apparatus of claim 1 wherein the hull sections are generally parallel.

11. The offshore floating wind turbine apparatus of claim 1 wherein the pair of gantries are each pinned to each hull section.

12. The offshore floating wind turbine apparatus of claim 1 wherein the pair of gantries are pinned to each hull section with uniaxial pinned connections.

13. The offshore floating wind turbine apparatus claim 12 wherein the uniaxial pinned connections are on a common axis.

14. The offshore floating wind turbine apparatus claim 13 wherein the common axis is the center line of the hull section.

15. An offshore floating wind turbine apparatus comprising:
   a) a pair of spaced apart barges with a space between said barges;
   b) a pair of frames that each connect to said barges, said frames being spaced apart, each said frame connected to one said barge with a pivotal connection and the other said barge with a universal joint connection;
   c) a wind turbine tower having upper and lower end portions;
   d) said wind turbine tower lower end portion having a base that is mounted to one of but not both of said frames;
   e) the wind turbine tower upper end portion having a rotor, hub, nacelle, and blades;
   f) said frame supporting said wind turbine being a truss having a plurality of upper beams and a plurality of lower beams;
   g) a tubular member that is spaced in between two said upper beams and in between two said lower beams, said wind turbine lower end mounted on said tubular member; and
   h) a mooring system that holds the pair of barges on a desired location.

16. The offshore floating wind turbine apparatus of claim 15 wherein the mooring system includes multiple mooring legs.

17. The offshore floating wind turbine apparatus of claim 16 wherein the mooring system includes between 8 and 16 mooring legs.

18. The offshore floating wind turbine apparatus of claim 15 wherein each barge has a bow and stern and wherein said base is in between each hull, bow and stern.

19. An offshore floating wind turbine apparatus comprising:
   a) a pair of spaced apart hull sections with a space between said hull sections each a) hull section having a deck;
   b) first and second one or more gantries that each connect to said hull sections, said one or more gantries spaced apart, each said gantry connected to a said hull section with a uniaxial pinned connection;
   c) said first gantry having a truss with upper and lower laterally extending beams and diagonally extending beams; said laterally and diagonally extending beams positioned above the hull section decks;
   d) a tubular member attached to said truss and extending to said upper and lower laterally extending beams;
   e) a wind turbine tower having upper and lower end portions;
   f) said wind turbine tower lower end portion mounted to one but not both of said one or more first and second gantries;
   g) the wind turbine tower upper end portion having a rotor, hub, and blades; and
   h) a mooring system that holds said hull sections on a desired location.

20. The offshore floating wind turbine apparatus claim 19 wherein the gantries are connected to a said hull section with multiple uniaxial pinned connections.

21. The offshore floating wind turbine apparatus claim 20 wherein the uniaxial pinned connections are on a common axis.

22. The offshore floating wind turbine apparatus claim 21 wherein the common axis is the center line of the hull section.

23. The offshore floating wind turbine apparatus of claim 19 wherein at least one of said gantries has a wider end and a narrower end.

24. The offshore floating wind turbine apparatus of claim 19 wherein at least one of said gantries has two wide ends.

25. The offshore floating wind turbine apparatus of claim 19 wherein the gantries each has two wide ends.

26. The offshore floating wind turbine apparatus of claim 19 wherein one hull section is longer than the other hull section.

27. The offshore floating wind turbine apparatus of claim 19 wherein the hull sections are the same length.

* * * * *